United States Patent
Lagace et al.

(10) Patent No.: US 7,458,228 B2
(45) Date of Patent: Dec. 2, 2008

(54) VENTILATION SYSTEM

(75) Inventors: Frederic Lagace, Drummondville (CA); Jean-Francois Grondin, Drummondville (CA); Pierre Cusson, St-Germain de Grantham (CA); Michel Julien, St-Nicéphore (CA); Daniel Marcoux, Drummondville (CA)

(73) Assignee: Venmar Ventilation Inc., Drummondville, Quebec (CA)

( * ) Notice: Subject to any disclaimer, the term of this patent is extended or adjusted under 35 U.S.C. 154(b) by 380 days.

(21) Appl. No.: 11/438,954

(22) Filed: May 23, 2006

(65) Prior Publication Data

US 2006/0219381 A1 Oct. 5, 2006

Related U.S. Application Data

(60) Continuation of application No. 09/989,277, filed on Nov. 20, 2001, now Pat. No. 7,073,566, which is a division of application No. 09/770,021, filed on Jan. 25, 2001, now abandoned, which is a continuation of application No. 08/329,124, filed on Oct. 25, 1994, now Pat. No. 6,209,622.

(30) Foreign Application Priority Data

Oct. 24, 1994 (CA) .................................. 2134168

(51) Int. Cl.
*F23D 23/00* (2006.01)
(52) U.S. Cl. .......................................... 62/271; 62/186
(58) Field of Classification Search .................... 62/186, 62/271; 165/8, 17, 54, 166
See application file for complete search history.

(56) References Cited

U.S. PATENT DOCUMENTS

| 3,125,157 A | 3/1964 | Munsters et al. |
| 3,467,176 A | 9/1969 | Truhan |
| 3,611,906 A | 10/1971 | Lorenz |
| 3,782,448 A | 1/1974 | Clark |
| 3,800,515 A | 4/1974 | Asker et al. |
| 3,844,737 A | 10/1974 | Macriss et al. |
| 3,968,833 A | 7/1976 | Strindelhag et al. |
| 3,977,466 A | 8/1976 | Johansson |
| 3,980,129 A | 9/1976 | Bergdahl |
| 4,093,435 A | 6/1978 | Marron et al. |
| 4,109,704 A | 8/1978 | Spethmann |

(Continued)

FOREIGN PATENT DOCUMENTS

CA 1285931 7/1991

(Continued)

*Primary Examiner*—Melvin Jones
(74) *Attorney, Agent, or Firm*—Fay Sharpe LLP

(57) ABSTRACT

The present invention relates to an apparatus for ventilation systems which include an element for the transfer of heat from warm exhaust air (taken from inside a building) to cooler exterior fresh air which is drawn into the building. The present invention in particular provides an apparatus whereby, during a defrost cycle, interior air may circulate through both of the fresh air and exhaust air paths for delivery back into the building, i.e. the warm interior air, used as defrost air, may be able to circulate from the interior of the building into the ventilation apparatus and back to the interior of the building. The apparatus can thus use interior air as defrost air while diminishing or avoiding the creation of a negative air pressure in the building.

18 Claims, 18 Drawing Sheets

U.S. PATENT DOCUMENTS

| | | | |
|---|---|---|---|
| 4,134,743 A | 1/1979 | Macriss et al. |
| 4,149,590 A | 4/1979 | Ospelt |
| 4,172,164 A | 10/1979 | Meyer et al. |
| 4,225,171 A | 9/1980 | Hay, II et al. |
| 4,228,849 A | 10/1980 | Heinola |
| 4,336,748 A | 6/1982 | Martin et al. |
| 4,391,321 A | 7/1983 | Thunberg |
| 4,402,717 A | 9/1983 | Izumo et al. |
| 4,426,853 A | 1/1984 | Mitani et al. |
| 4,437,608 A | 3/1984 | Smith |
| 4,461,344 A | 7/1984 | Allen et al. |
| 4,493,361 A * | 1/1985 | Sevastakis | 164/443 |
| 4,497,361 A | 2/1985 | Hojicek |
| 4,513,809 A | 4/1985 | Schneider et al. |
| 4,653,574 A | 3/1987 | Quinlisk et al. |
| 4,729,774 A | 3/1988 | Cohen et al. |
| 4,769,053 A | 9/1988 | Fischer, Jr. |
| 4,841,733 A | 6/1989 | Dussault et al. |
| 4,874,042 A | 10/1989 | Becker |
| 4,875,520 A | 10/1989 | Steele et al. |
| 4,952,283 A | 8/1990 | Besik |
| 4,971,137 A | 11/1990 | Thompson |
| 5,002,118 A | 3/1991 | Olmstead et al. |
| 5,024,263 A | 6/1991 | Laine et al. |
| 5,148,374 A | 9/1992 | Coellner |
| 5,193,610 A | 3/1993 | Morissette et al. |
| 5,238,052 A | 8/1993 | Chagnot |

FOREIGN PATENT DOCUMENTS

| | | |
|---|---|---|
| JP | 100648 | 9/1978 |
| JP | 0002991 | 1/1982 |
| JP | 3087547 | 4/1991 |

* cited by examiner

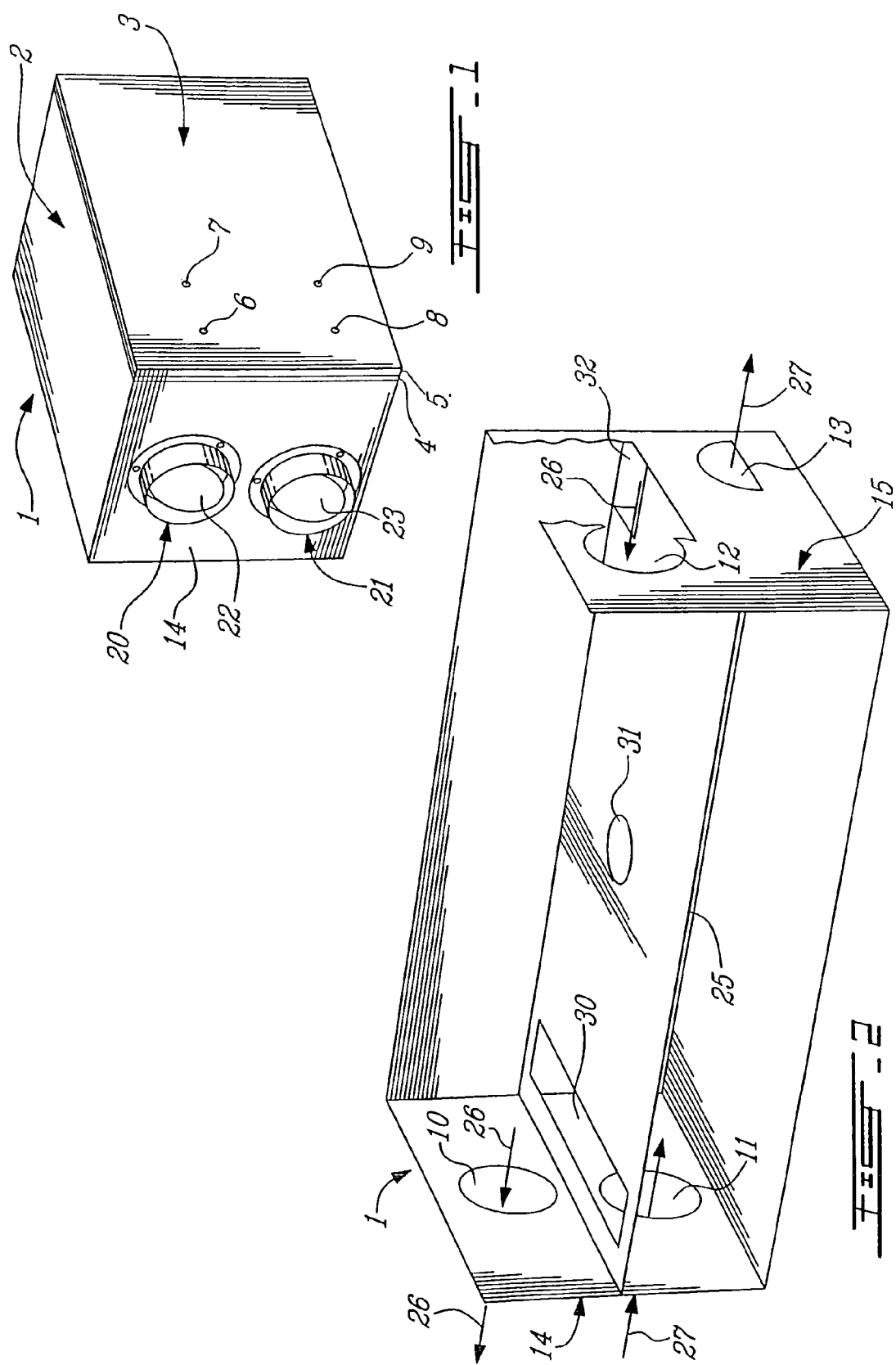

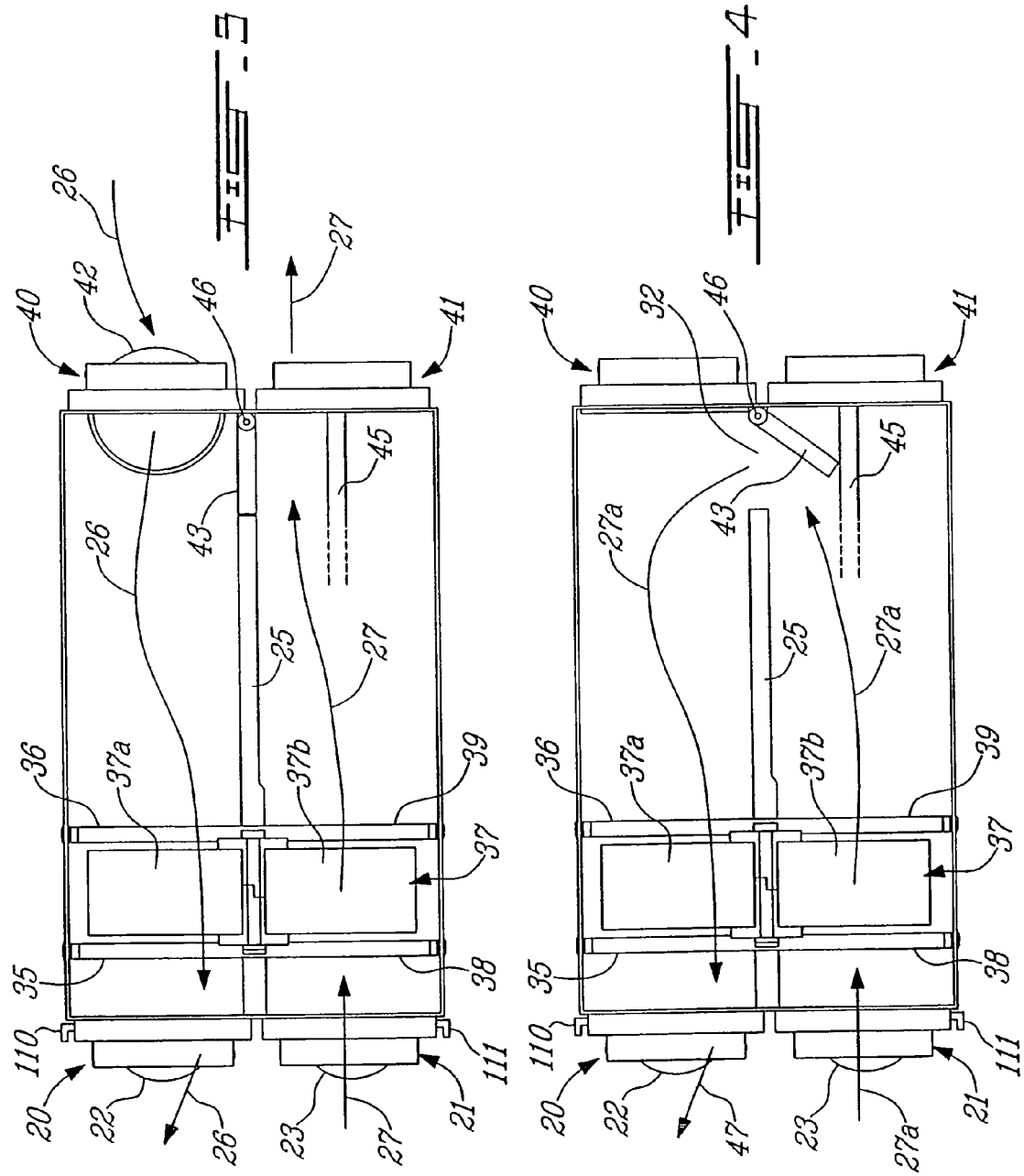

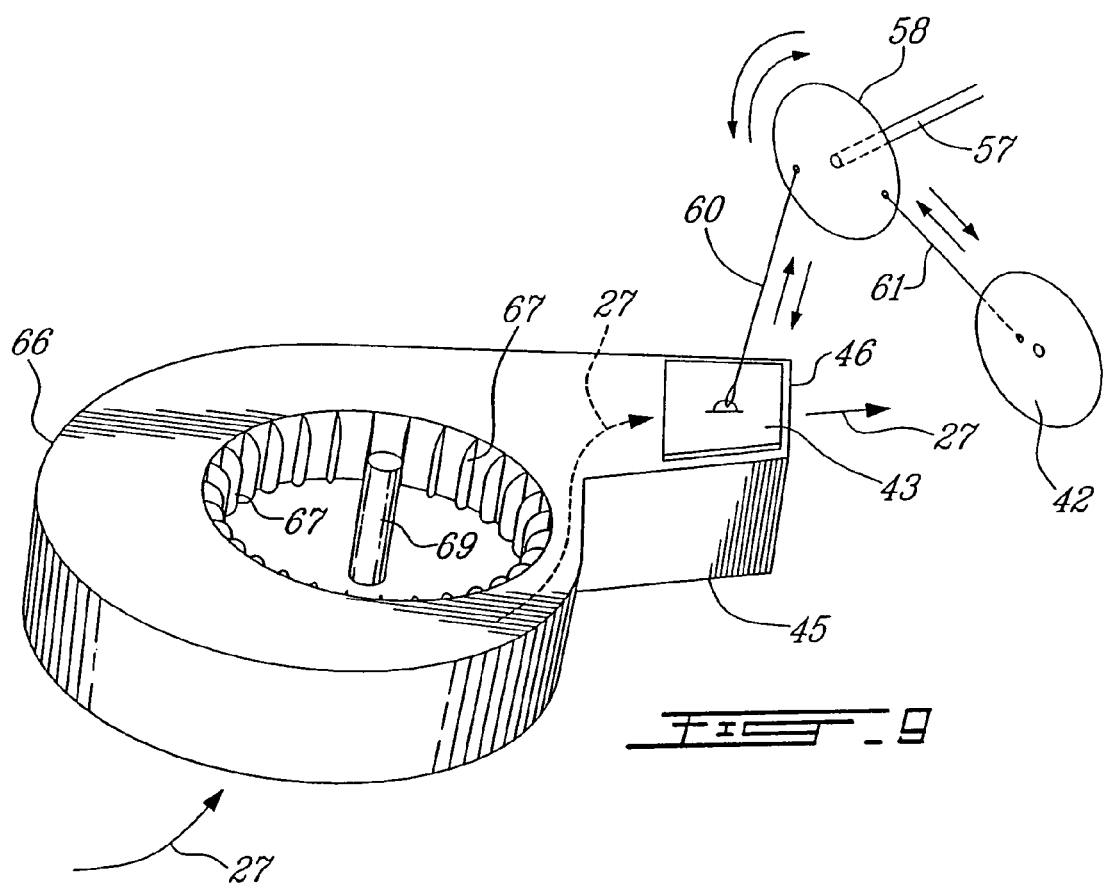
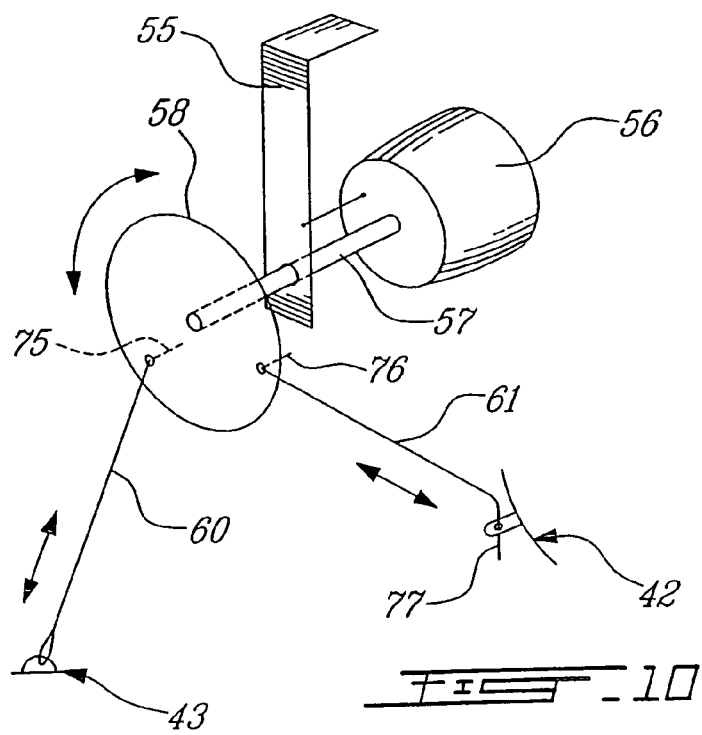

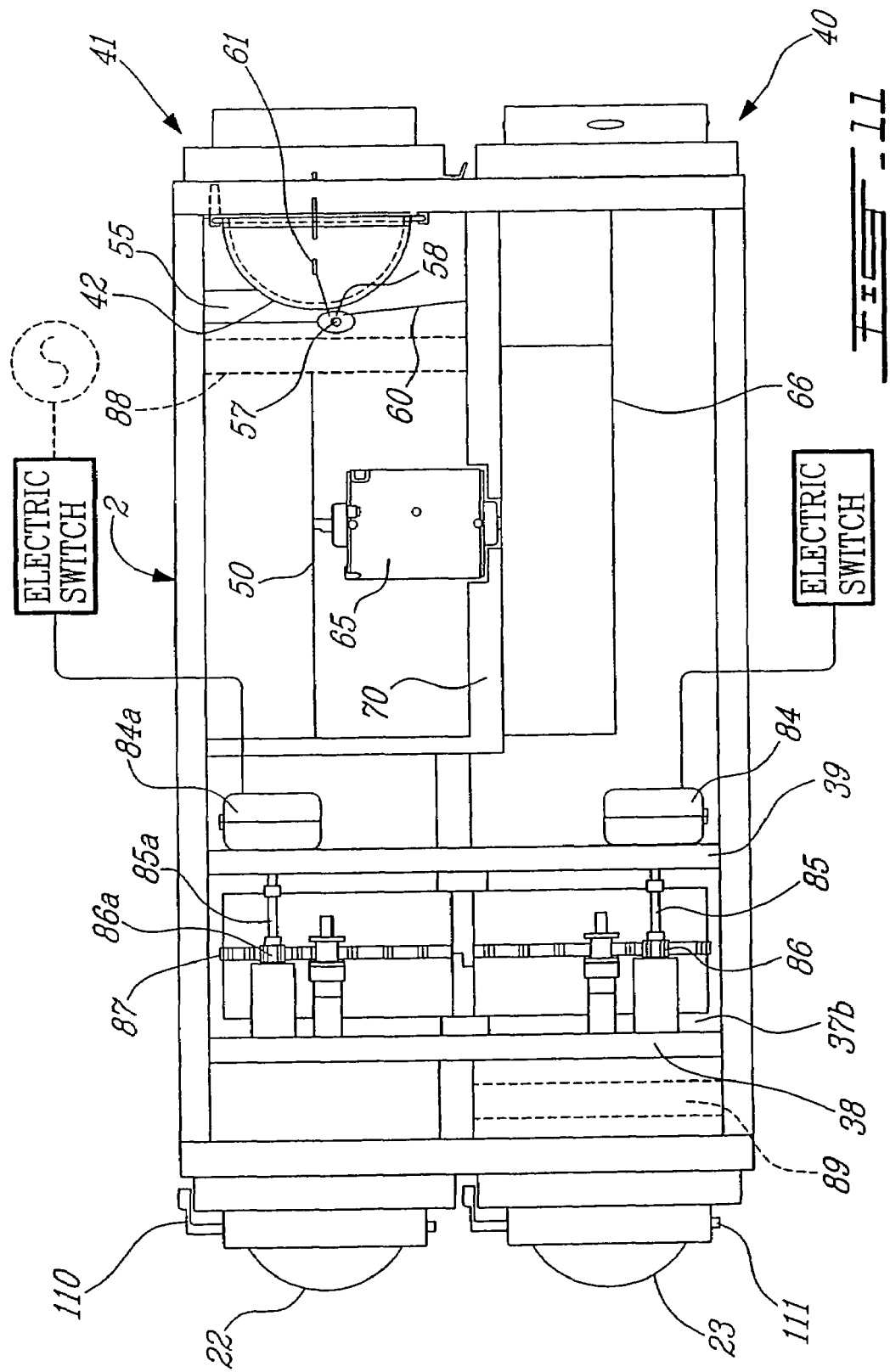

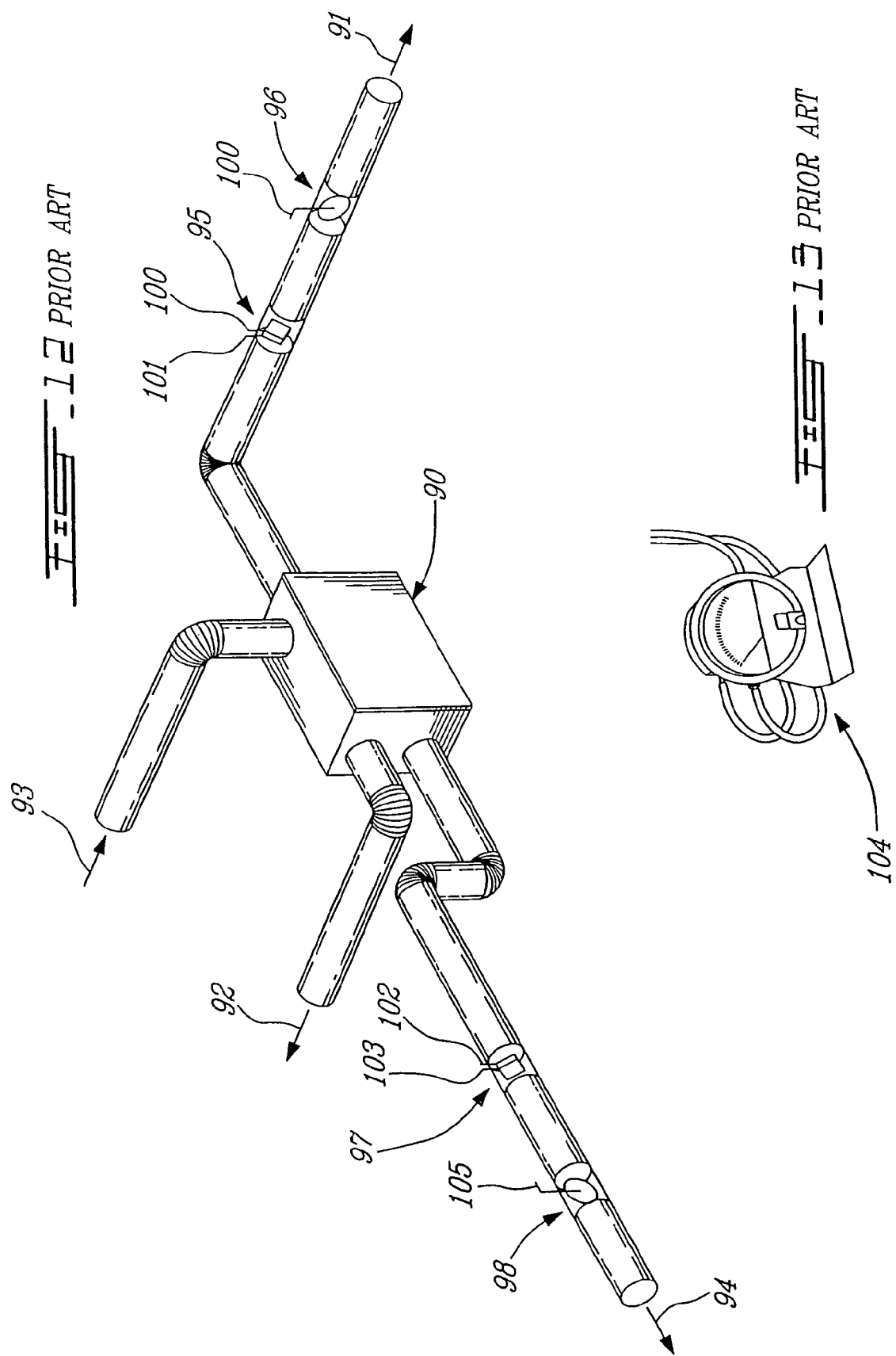

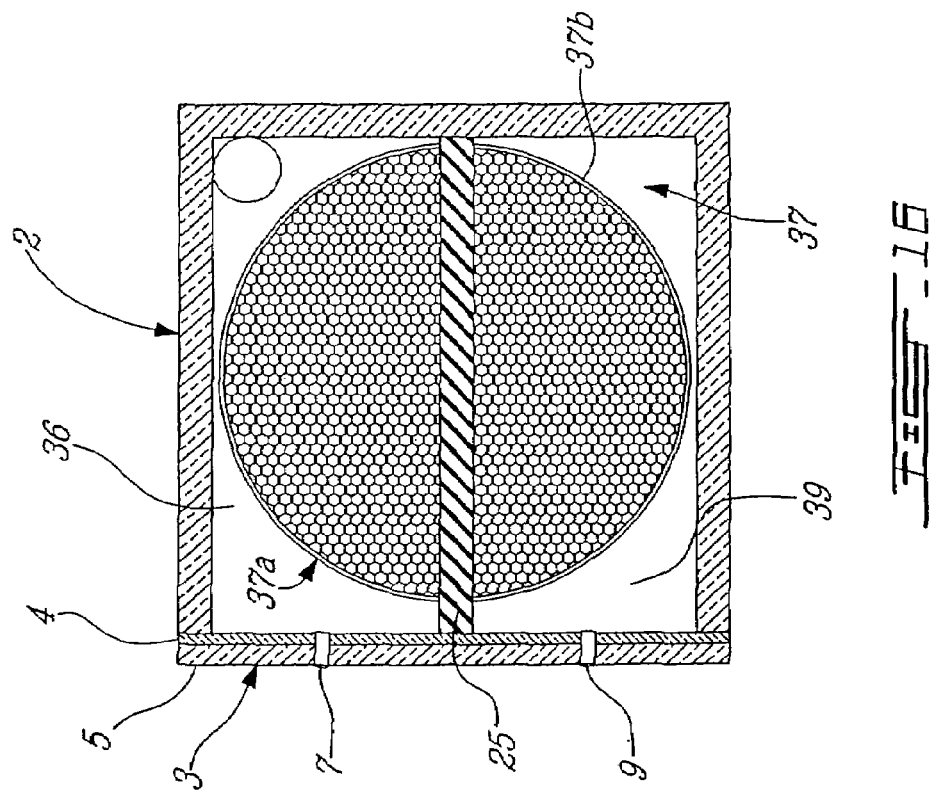
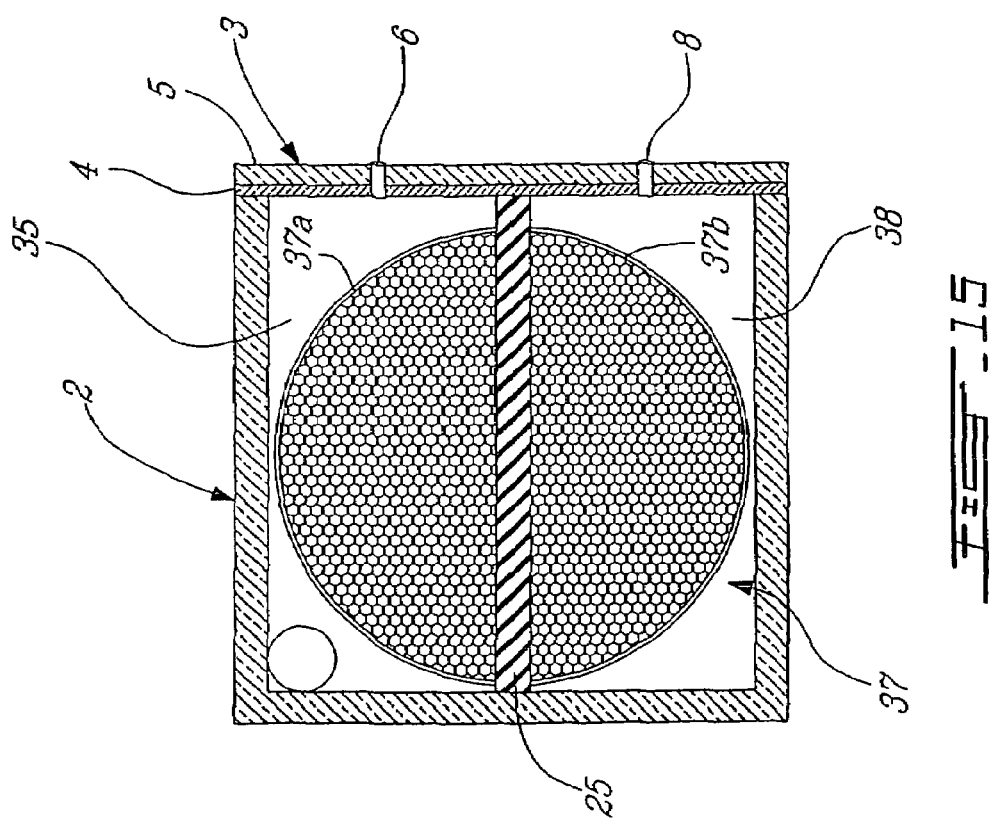

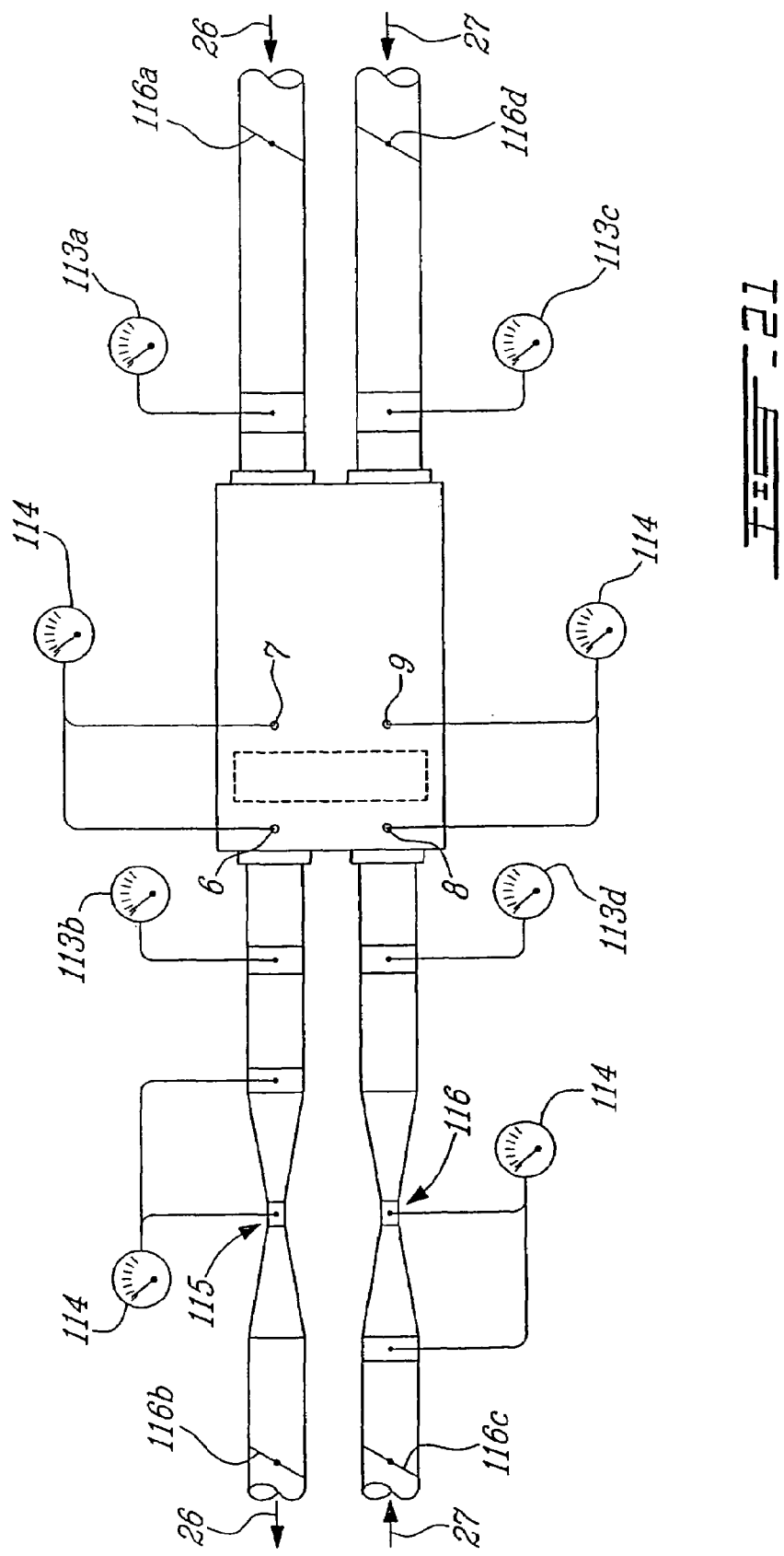

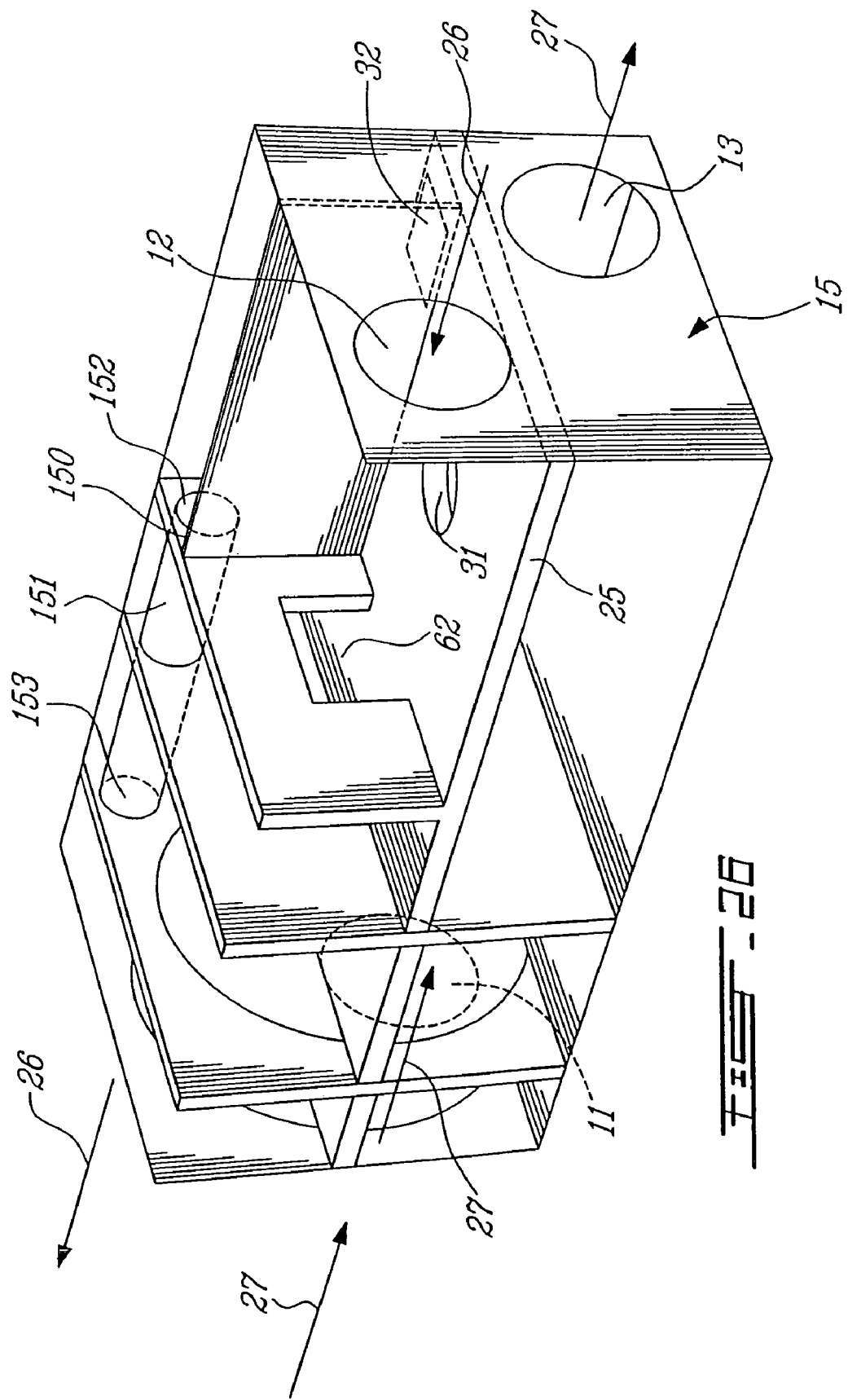

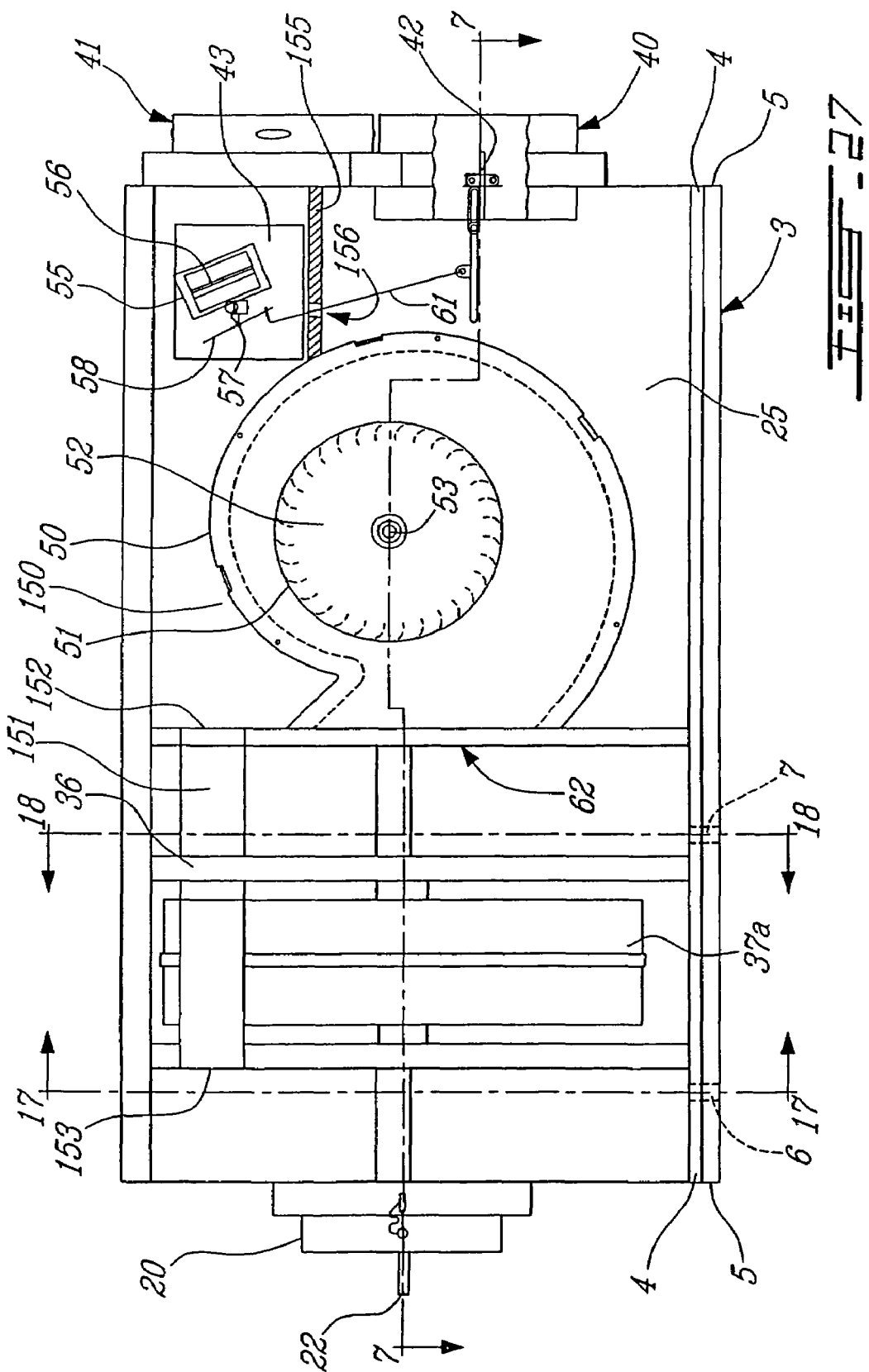

US 7,458,228 B2

VENTILATION SYSTEM

Priority is hereby claimed under § 119 or 365(a) or 365(b) to Foreign Patent Application No. 2,134,168, filed Oct. 24, 1994 in Canada. This application is a continuation application of prior application Ser. No. 09/989,277, filed Nov. 20, 2001, now U.S. Pat. No. 7,073,566, which is a divisional application of U.S. application Ser. No. 09/770,021, filed Jan. 25, 2001, now abandoned, which was a continuation application of U.S. application Ser. No. 08/329,124, filed Oct. 25, 1994, now U.S. Pat. No. 6,209,622, the disclosures of which are incorporated herein by reference.

BACKGROUND OF THE INVENTION

The present invention generally relates to an apparatus for ventilation systems which have means for the transfer of sensible heat and/or water moisture between exhaust air (taken from inside a building) and exterior fresh air (drawn into the building). Such an apparatus may, for example, have means for the transfer of sensible heat and/or water moisture from warm exhaust air to cooler exterior fresh air, the systems using warm interior air as defrost air for defrosting the systems during cool weather.

The present invention, in one particular aspect, relates to an apparatus for ventilation systems which have at least one rotary heat exchanger wheel for the transfer of heat (and/or water moisture) from warm exhaust air (taken from inside a building) to cooler exterior fresh air (drawn into the building).

The present invention, in another particular aspect, relates to a ventilation apparatus for ventilation systems having an exchanger body which may comprise one or more heat exchanger elements of the same or different type e.g. one or more rotary and/or one or more stationary (i.e. non-rotary) exchanger elements or cores.

The present invention, in a further particular aspect, relates to a ventilation apparatus provided with means for balancing fresh air and exhaust air flow through the operating ventilation apparatus; a method for balancing airflow though the apparatus is also provided.

Sensible heat and/or water moisture recovery ventilation systems are known which function to draw fresh exterior air into a building and to exhaust stale interior air to the outside. The systems are provided with appropriate ducting, channels and the like which define a fresh air path and an exhaust air path whereby interior air of a building may be exchanged with exterior ambient air; during ventilation the air in one path is not normally allowed to mix with the air in the other path.

A sensible heat and/or water moisture recovery ventilator device or apparatus, which may form part of a ventilation system, in addition to being provided with corresponding air paths may also be provided with one or more exchanger elements or cores, e.g. one or more rotary and/or stationary (i.e. non-rotary) exchanger elements or cores. Heat recovery ventilation devices may also have a housing or cabinet; such enclosures may for example be of sheet metal construction (e.g. the top, bottom, side walls and any door, etc. may be made from panels of sheet metal). The heat exchanging core(s), as well as other elements of the device such as, for example, channels or ducts which define air paths, filtration means, insulation and if desired one or more fans for moving air through the fresh air and exhaust air paths may be disposed in the enclosure. Such ventilation devices may be disposed on the outside of or within a building such as a house, commercial building or the like; appropriate insulation may be provided around any duct work needed to connect the device to the fresh air source and the interior air of the building.

A stationary heat exchanger element(s) may, for example, take the form of the (air-to-air) heat exchanger element as shown in U.S. Pat. No. 5,002,118 the contents of which are incorporated herein by reference. Thus, the heat exchanger element(s) may have the form of a rectangular parallelepiped and may define a pair of air paths which are disposed at right angles to each other; these exchanger element(s) may be disposed such that the air paths are diagonally oriented so that they are self draining (i.e. with respect to any condensed or unfrozen water).

Another known type of exchanger element is the rotary thermal and/or desiccant wheel; such (air-to-air) exchanger wheels may have an air permeable heat exchange matrix which provides passageways therethrough through which an air stream may flow. The exchanger matrix may, for example, comprise a plurality of parallel flow channels (see for example U.S. Pat. No. 4,769,053) or even a random matrix media (see for example U.S. Pat. No. 5,238,052). Such exchangers may be configured and disposed such that as they rotate they may transfer a member of the group comprising i) sensible heat and ii) sensible heat and latent heat, between two or more streams of air through which the exchangers rotationally pass through. Such rotary heat exchangers may be disposed in a housing which is suitably baffled such that a rotating exchanger wheel may pass through the fresh air and exhaust air streams with minimal intermixing thereof (i.e. for air-to-air transfer of latent/sensible heat).

Thus, for example, as a suitably configured rotary transfer core slowly rotates between outgoing and ingoing air the higher temperature airstream can give up sensible energy to the core which energy may thereafter be given up by the core to the lower temperature air stream; please see, for example, U.S. Pat. No. 3,844,737. Alternatively, a suitably configured rotary core may capture and release latent energy in the form of water moisture i.e. the core may transfer water vapour or moisture from one air stream to another air stream; please see, for example, U.S. Pat. Nos. 3,800,515, 3,844,737, 4,225,171, and 4,875,520. A rotary energy transfer core or wheel may of course transfer both sensible and latent heat between fresh air and exhaust air; please see, for example, Canadian patent no. 1,285,931, and U.S. Pat. Nos. 4,769,053, 4,172,164, 4,093, 435, and 5,238,052. The entire contents of the above mentioned patents are herein incorporated by reference.

During the winter season, the outside air is not only cool but it is also relatively dry. Accordingly, if cool dry outside air is brought into a building and the warm moist interior air of the building is merely exhausted to the outside, the air in the building may as a consequence become uncomfortably dry. A relatively comfortable level of humidity may be maintained in a building by inter alia exploiting an above mentioned desiccant type thermal wheel for transferring water from the stale outgoing air to the relatively dry fresh incoming air. During winter these types of heat exchangers may transfer up to 80% of the moisture contained in the exhaust air to the fresh supply air. Advantageously a rotary exchanger wheel may transfer both sensible and latent heat between fresh air and exhaust air; in this case the exhaust air stream as it is cooled may also be dried whereas the incoming fresh air may be warmed as well as humidified. However, a problem with such heat recovery ventilation equipment having a desiccant type heat exchanger wheel, is the production of frost or ice in the air permeable heat exchange matrix of the thermal wheel.

During especially cold weather such as −10° C. or lower (e.g. −25° C. or lower), prior to expelling the relatively warm exhaust air, the equipment provides for the transfer of latent heat from the relatively warm moist exhaust air to the relatively cool dry (fresh) outside air by the use of a suitable desiccant type heat exchange wheel. However, the cooling of the relatively moist interior air by the cold exterior air can result in the formation of ice (crystals). An uncontrolled buildup of ice within the matrix of a rotary exchanger wheel can result in decreased heat transfer, and even outright blockage not only of the exhaust air path but the (cold) fresh air path as well. Accordingly a means of periodically defrosting such a system is advantageous in order to maintain the system's efficiency.

A defrost mechanism has been suggested wherein the fresh air intake is periodically blocked off by a damper and warm interior air is injected, via a separate defrost air conduit, into the fresh air inlet side of the fresh air path of the ventilation apparatus. However, during the defrost cycle, the stale inside air is still exhausted to the outside via the exhaust air path; this is disadvantageous since by blocking only the fresh air inlet and continuing to exhaust interior air to the outside, a negative air pressure can be built up in the interior of a building relative to the exterior atmosphere. Such a negative pressure may induce uncontrolled entry of air through any cracks and crannies in the structure of the building; the negative pressure may, in particular, produce a backdraft effect, for oil and gas type heating systems, whereby exterior air may be pulled into the chimney leading to the accumulation of gaseous combustion products in the building.

An alternate system has been suggested wherein both the fresh air inlet and exhaust air outlet are both blocked off such that warm interior air is circulated through the fresh air side of the heat exchanger element as well as through the exhaust air side of the heat exchanger element and is sent back into the building; see for example U.S. Pat. No. 5,193,610 the entire contents of which are incorporated herein by reference.

It is desirable that the defrosting time period be as short as possible and in particular not be greater than 25% of the time period during which a ventilation apparatus is in the ventilation configuration (e.g. if the ventilation time period is 32 minutes then desirably the defrosting time period should not be greater than about 8 minutes). However, it has been found that adapting the technique shown in U.S. Pat. No. 5,193,610 to a rotating heat exchanger wheel by directing interior defrost air through the defrost side of the wheel and then returning the air to the building by passing it through the fresh air side of the wheel while the wheel is rotating at its usual operational or ventilation cycle rotational speed (e.g. a usual ventilation speed of 15 rpm) does not produce the desired degree or efficiency of defrosting; in this case, heat which is initially taken up by the wheel from the warm interior building air is transferred back to the interior air prior to the air being recycled to the interior of the building such that the full heat of the interior air is not utilized for defrosting. If the usual rotational speed mentioned above is maintained, defrosting occurs over a relatively significant time period (e.g. a defrost time of 18 minutes or more) relative to the ventilation time period (e.g. a ventilation time of 32 minutes) during which the apparatus is operating; i.e. the defrosting period may represent more than 25% of the ventilation operating time which means that this defrosting technique is relatively inefficient keeping in mind that during such defrosting, the system is not carrying out its primary function, namely the ventilation of a room or building.

Another problem with respect to ventilation systems comprising a heat exchanger element or core relates to the installation of an exchanger device in a building such as for example a house or other type of building. In order for the system to operate efficiently and effectively the outgoing exhaust air flow preferably at least substantially equals the incoming fresh air flow; i.e. the exhaust and fresh air flows are preferably balanced so as to minimize or eliminate under-pressure or over-pressure in the house relative to the outside atmospheric pressure; a certain degree of overpressure may, however, be tolerated.

Presently, such ventilation systems are balanced by means of balancing dampers and removable flowmeters such as, for example, a pitot tube type flow measuring device comprising a manometer to measure pressure difference; these elements must usually be installed by the balancing technician at appropriate places in the duct work connected to the ventilation device.

Thus, for example, one removable flowmeter element may be installed in a duct on the exhaust air inlet side of the device and another flowmeter element may be installed in a duct on the fresh air outlet side of the ventilator device. However, the removable flowmeter detector elements must be temporarily installed between straight lengths of duct of relatively sufficient length so as to be localized in a relatively stable airflow (steady state condition) and thus minimizes erroneous or misleading readings due to turbulence as may be encountered about an elbow or bend element of a duct.

The exhaust and fresh air flows may be initially measured by placing the balancing dampers parallel to the air flow so as to present a minimum resistance to air flow. The fresh air and exhaust air flow rates may then be determined using the respective flowmeters. A fresh air damper may in this case be adjusted so as to reduce the fresh air flow out of the ventilator to be equal to or be up to about +5% of the exhaust air input to the ventilator, i.e. as the damper is turned, so as to present a larger surface area transverse to the direction of the air flow, the flowmeter is monitored and the adjustment stopped once the flowmeter indicates a flow rate more or less equal to that of the exhaust air flowing into the ventilator as initially determined.

The exhaust air flow rate into the ventilator may then be remeasured and, if necessary, (i.e. if the exhaust flow is higher than the fresh air input flow), the exhaust air damper may be adjusted (i.e. turned into the air flow) so as to reduce the exhaust air flow input into the ventilator to more or less equal the adjusted fresh air flow out of the ventilator. For example, the exhaust air flow may be adjusted so as to be somewhat smaller than the fresh air flow so as to provide a slight overpressure in the building, i.e. so as, for example, to inhibit uncontrolled entry of fresh air through other parts of the building. Thereafter at least the flowmeters must be removed and replaced by the balancing technician with appropriate duct portions. This procedure as may be appreciated is time consuming and may take up to an hour or more of a technician's time.

It would therefore be advantageous to have a rotating wheel heat exchanger system which can use interior air as defrost air so as to diminish or avoid the creation of a negative air pressure in the building.

It would also be advantageous to have a defrostable ventilation apparatus which is of simple construction.

It would be advantageous to be able to operate a ventilation apparatus during periods of cool exterior temperature for an extended period of time before having to defrost it. It would in particular be advantageous to have a rotating wheel heat exchanger type system which can operate for extended periods of time during periods of cool exterior temperatures before having to be defrosted.

It would in another aspect be advantageous to have an alternate method and means for balancing input and output airflow through a heat exchanger device or system.

It would in particular be advantageous to have a means of relatively simple construction for balancing input and output airflow through a heat exchanger device or system.

SUMMARY OF THE INVENTION

The present invention in a first aspect deals with the problem of defrosting an heat exchanger wheel while avoiding negative air pressure inducement.

Thus, in one general aspect the present invention provides a method for defrosting a ventilation apparatus configured to transfer water moisture and sensible heat between fresh air delivered to and exhaust air taken from a building (i.e. any enclosed space) by means of a rotating exchanger wheel defining a first air path for fresh air and a second air path for exhaust air, said method comprising i) directing exhaust air to flow through one of said first and second air paths and then through the other of said first and second air paths back into said building, and ii) attenuating the rotation of said exchanger wheel during a defrost cycle such that said rotary exchanger wheel is able to be relatively effectively defrosted by said exhaust air, namely, by inducing the rotary exchanger wheel to rotate at a rotational speed of from 0 to 2 rpm (e.g. by stopping the rotation of the wheel or else inducing an exchanger wheel rotational speed of 2 rpm or less), Preferably, during the defrost cycle, the exhaust air is directed to flow through said second air path and then through said first air path back into said building, and the rotation of the exchanger wheel may be merely stopped, i.e. the wheel does not rotate during the defrost cycle.

The present invention in accordance with another general aspect provides a defrostable ventilation apparatus, for exchanging interior air of a building (i.e., any enclosed space), with air exterior to the building for transferring water moisture and sensible heat between exhaust air taken from the building and fresh air taken from air exterior to the building, and wherein interior air taken from the building is used as defrost air to defrost the ventilation apparatus, said ventilation apparatus having fresh air path means having a fresh air intake side and a fresh air discharge side, exhaust air path means having an exhaust air intake side and an exhaust air discharge side, a rotary exchanger wheel for transfer of water moisture and sensible heat between said exhaust air and said fresh air, said exchanger wheel being configured and rotatably disposed so as to define a first air stream path and a second air stream path, said first air stream path defining a portion of said fresh air path means between the fresh air intake side and the fresh air discharge side thereof and said second air stream path defining a portion of said exhaust air path means between the exhaust air intake side and the exhaust air discharge side thereof, a ventilation rotation component for inducing, during a ventilation cycle, ventilation rotation of said exchanger wheel through said fresh air path means and said exhaust air path means, characterized in that said apparatus comprises defrost air path means for conveying defrost air to said fresh air intake side, a damper component, said damper component being displaceable between a ventilation configuration wherein said defrost air path means is closed off and said fresh air intake side and said exhaust air discharge side are open, and a defrost configuration wherein said fresh air intake side and said exhaust air discharge side are closed off and said defrost air path means is open, and a defrost rotation component for inducing, during a defrost cycle, said rotary exchanger wheel to rotate at a defrost rotation speed of from 0 to 2 rpm through said fresh air path means and said exhaust air path means, and wherein during a ventilation cycle, when said damper component is in said ventilation configuration, fresh air is able to flow through said fresh air path means and exhaust air is able to flow through said exhaust air path means, and during a defrost cycle, when said damper component is in said defrost configuration, defrost air taken from the building, is able to circulate, for delivery back into the building, through said exhaust air intake side, through said second air stream path, then through said defrost air path means, through said first air stream path, and through said fresh air discharge side.

It is to be understood herein that the word "building" is a refers to any enclosed space whatsoever, e.g. a one room building, a multi-room building, a room of a building and the like.

It is to be understood that as used herein the expression "ventilation cycle" refers to the time period during which the ventilation apparatus operates in a ventilation mode so as to bring fresh air into the enclosed space and expel exhaust air out of the enclosed space.

It is to be understood that as used herein the expression "defrost cycle" refers to the time period during which the ventilation apparatus operates in a defrost mode wherein exhaust air is delivered to the ventilator and expelled back into the enclosed space.

It is to be understood herein that the expression "ventilation rotation" refers to the rotation of a rotary exchanger wheel during the "ventilation cycle" during which the ventilation apparatus operates so as to bring fresh air into the enclosed space and expel exhaust air out of the enclosed space whereby an exchange of energy is effected between the outgoing and ingoing air. An exchanger wheel during a ventilation cycle may, for example, have an operational or ventilation rpm (revolutions per minute) of from about 15 to about 18 rpm; i.e. for an exchanger wheel such as a Honeycomb silica gel wheel by Munters CargoCaire, Mass. USA operable at 60 to 200 cfm; the 3A desiccant thermal wheel by Semco Inc. Missouri, USA.

It is to be understood herein that the expression "defrost rotation" refers to the rotation of the rotary exchanger wheel during the defrost cycle at a rotation speed of from 0 to 2 rpm whereby a defrosting of the wheel may be effected by interior defrost air.

The means for attenuating or controlling the rotation of the heat exchanger wheel during a defrost cycle, depending on the system configuration, must be such so as to reduce the usual operational or ventilation rpm so that a defrosting of the wheel may be effected by interior air (i.e. the operation rpm may, for example, be reduced from about 15 to 18 rpm to about 2 rpm or slower whereby a defrosting of an exchanger wheel may be effected); the exact attenuation or reduction necessary to effect defrosting with interior air will of course be predetermined on a system to system basis.

Advantageously, in terms of relatively lower cost and simplicity, the ventilation apparatus may be configured such that during the defrost cycle the exchanger wheel is stopped, i.e. the exchanger wheel has a rotational speed of 0 rpm. Thus a ventilation apparatus of the present invention may comprise a component for stopping, during a defrost cycle, a rotary exchanger wheel from rotating.

A ventilation apparatus may, for example, comprise an electric motor for inducing operational rotation of the exchanger wheel e.g. during a ventilation cycle. The apparatus may, for example, also include a component for stopping the rotation of the exchanger wheel in the form of an electric switch configured so as to de-energize the motor during a defrost cycle. During a defrost cycle the switch is thrown so as to cut off the supply of electric power to the motor while during a ventilation cycle the switch is set such that electric power (i.e. current) flows to the motor which is energized thereby. Any known suitable switch may of course be used for the purpose of energizing and de-energizing the motor. The switch may, if desired, include a (known) timer mechanism such that after a predetermined period for the defrost cycle the switch will be turn to the on position so as to restart the motor for a ventilation cycle; the switch may of course be set up so as to manually turn the motor on or off, i.e. energize and de-energize the motor.

Alternatively, the component for stopping the rotation of the wheel during a defrost cycle may comprise any known type of gearing mechanism whereby the motor can be made to be engaged with or disengaged from the wheel for rotation or non-rotation thereof.

Alternatively as mentioned, above the rotation of the exchanger wheel may during a defrost cycle be induced to rotate at 2 rpm or less; i.e. to rotate at a relatively slower speed than the usual operational speed during a ventilation cycle. The mechanism whereby the rotation of the wheel is to be reduced but not stopped may take any desired form whatsoever. Any known speed reducing gearing mechanism may, for example, be directly or indirectly coupled to the wheel in any suitable or known manner whereby the speed of rotation of the wheel may be reduced to a defrost rotation of 2 rpm or lower. If desired, instead of being provided with a gearing mechanism, a ventilation apparatus may be provided with two electric motors, one being set up to run at a fixed speed for inducing a ventilation speed rotation of the wheel (e.g. 15 to 18 rpm) and the other being set up to run at a fixed speed for inducing a defrost speed rotation of the wheel (e.g. 2 rpm); during the ventilation cycle the ventilation motor is energized and the defrost rotation motor is de-energized whereas during the defrost cycle the reverse is the case. Alternatively the means for inducing defrost rotation may comprise a suitably configured stepper motor, i.e. a variable speed motor.

In accordance with the present invention a defrost air path means for an above described apparatus may, for example, advantageously take the form of an opening in a suitably disposed partition wall separating the various air paths (e.g separating said exhaust air discharge side from said fresh air intake side); the damper component referred to above may for example block and unblock such opening depending on whether a ventilation or defrost configuration is desired.

In accordance with another aspect the present invention generally provides a method for exchanging interior air of a building with air exterior to the building, and for transferring water moisture and sensible heat between exhaust air taken from the building and fresh air taken from the air exterior to the building, said method comprising removing water moisture from exhaust air so as to obtain dried exhaust air, transferring sensible heat from said dried exhaust air to fresh air taken from the air exterior to the building so as to obtain warmed fresh air and cooled exhaust air, exhausting said cooled exhaust air to the air exterior to the building transferring water moisture removed from said exhaust air to said warmed fresh air so as to obtain humidified warmed fresh air and delivering said humidified warmed fresh air to the interior air of said building.

The above method is advantageous for use in cool weather, such as for example when ambient air temperature is −15° C. or lower (e.g. −15° C. to −25° C.). For this method the exhaust air may be dried using a first desiccant exchanger before it is passed through a subsequent sensible heat exchanger for additional cooling due to the transfer of sensible heat to incoming cool fresh air. Since the air initially heating the incoming air is relatively dry the possibility of the subsequent exchanger icing up may be reduced; on the other hand since the warmed incoming air to which the moisture is being transferred by the first rotary exchanger has been pre-heated the possibility of the desiccant exchanger icing up may also be reduced. This type of method may therefore be used for relatively longer periods of time at very cool ambient air temperatures before having to revert to a defrost cycle. Advantageously, the desiccant exchanger may be configured as a rotary exchanger wheel; any other suitable or known desiccant configuration may however of course be used.

Thus in accordance with a more particular aspect the present invention also provides a ventilation apparatus, for exchanging air between the interior air of a building with air exterior to the building, and for transferring water moisture and sensible heat between exhaust air taken from the building and fresh air taken from air exterior to the building, said ventilation apparatus comprising fresh air path means having a fresh air intake side and a fresh air discharge side, exhaust air path means having an exhaust air intake side and an exhaust air discharge side, an exchanger comprising
  a desiccant exchanger element for transfer of water moisture and sensible heat between said exhaust air and said fresh air, and
  a sensible heat exchanger element for transfer of sensible heat between said exhaust air and said fresh air, said desiccant exchanger element comprising a rotary exchanger wheel configured and rotatably disposed so as to define a second air stream path and a third air stream path,
  said second air stream path defining a portion of said fresh air path means and said third air stream path defining a portion of said exhaust air path means, said sensible heat exchanger element comprising
  a first air path defining a portion of said fresh air path means and a fourth air path defining a portion of said exhaust air path means, said first and second air stream paths defining respective portions of said fresh air path means between the intake and discharge sides of said fresh air path means, said third and fourth air stream paths defining respective portions of said exhaust air path means between the intake and discharge sides of said exhaust air path means, said fresh air path means and said exhaust air path means being disposed and configured such that during a ventilation cycle, exhaust air entering the exhaust air intake side flows through said third air stream path and then through said fourth air stream path and fresh air entering said the fresh air intake side flows through said first air stream path and then through said second air stream path, said ventilation apparatus including a rotation component for inducing rotation of said exchanger wheel through said fresh air path means and said exhaust air path means.

Preferably, a desiccant wheel will have a high as possible rate of efficiency with respect to the transfer of water to the incoming cool air, e.g. 80%; lower efficiency wheels may of course be used if so desired, keeping in mind, however, that the drier the air is, which is sent to the sensible exchanger, the longer the time interval is between defrostings.

A sensible heat exchanger may take any known suitable form whatsoever. A sensible heat exchanger element may, for example, comprise air-to-air heat exchanging walls between the first and fourth air paths. The sensible heat exchanger element may be of a rectangular parallelepiped shape, the first and fourth air paths thereof being disposed at right angles to each other; see for example U.S. Pat. No. 5,002,118 wherein such a heat exchanger is shown. Such a rectangular exchanger may be disposed such that the first and fourth air paths are diagonally oriented so that they are self draining; see for example U.S. Pat. No. 5,193,610 wherein such disposition of a rectangular exchanger core is shown.

The sensible heat exchanger element if so desired may for example be a rotary sensible heat exchanger wheel configured and rotatably disposed so as to define the first and fourth air stream paths. The apparatus in this case will include a rotation component for inducing rotation of the sensible heat exchanger wheel through said fresh air path means and said exhaust air path means.

As previously mentioned a ventilation system which includes a pre-drying stage of the exhaust air and a pre-heating stage for the incoming cool fresh air may go for relatively long periods without the need to be defrosted. Accordingly a defrost capability need not necessarily be built into such a system. However, such a system may if desired include a defrost system as described herein, i.e. of the by-pass type or of the rotation speed attenuation type.

In accordance with the present invention, a ventilation apparatus comprising the above mentioned desiccant exchanger element and sensible heat exchanger may include a defrost air path means for conveying defrost air to said fresh air intake side, said defrost air path means being configured to connect the exhaust air discharge side with the fresh air intake side for conveying defrost air to the fresh air intake side from the exhaust air discharge side and a damper component which is displaceable between a ventilation configuration for a ventilation cycle, where the defrost air path means is closed off and the fresh air intake and exhaust air discharge side are open, and a defrost configuration for a defrost cycle, where the fresh air intake side and exhaust air discharge side are closed off, and the defrost air path means is open. During the ventilation cycle, when the damper component is in the ventilation configuration, fresh air is able to flow through the fresh air path means and exhaust air is able to flow through the exhaust air path. During a defrost cycle, when the damper component is in the defrost configuration, defrost air taken from the building is able to circulate for delivery back into the building, through the exhaust air intake side, through the third air stream path, through the fourth air stream path, and then through the defrost air path means, through the first air stream path, through the second air stream path, and through the fresh air discharge side.

A ventilator apparatus may of course be configured such as to have plurality of fresh air and/or exhaust air ducts each including a corresponding first and/or second air stream paths, i.e. each room in a building may be separately connected to the apparatus and/or the exterior of the building. Preferably, however, the apparatus is provided with a single exhaust air path and a single fresh air path comprising corresponding first and second air stream paths; e.g. in this case a manifold like duct structure may deliver air from a plurality of rooms to the apparatus.

In accordance with the present invention, a defrost air path means may be configured as a single defrost air path to take warm defrost air from the exhaust air outlet side of the apparatus' exhaust air path and deliver it to the fresh air inlet side of the apparatus' fresh air path for subsequent delivery back into the building. Thus, only three distinct air paths are required in order for such an apparatus to provide both a ventilation and a defrost cycle. More particularly, if such an apparatus of the present invention were, for example, to be housed in a single cabinet, the cabinet would need only four (external) openings, namely, two for the fresh air and two for the stale air; for such an example embodiment of the present invention, during the ventilation cycle, the defrost air path would be blocked and the four openings would be in use whereas during the defrost cycle the fresh air intake and exhaust air discharge openings would be blocked, the defrost air path would be unblocked and only the remaining two openings would be respectively in use as inlet and outlet for the defrost exhaust air. This type of apparatus may in this way give rise to a relatively compact ventilation heat exchange module. Although specific mention has been made to blocking off openings it is to be understood that blockage may occur at any suitable point along the air paths provided that air is able to circulate as herein described during the ventilation and defrost cycles.

In accordance with the present invention a defrostable ventilation apparatus may, for example, take the form of a module having a housing or cabinet in which is disposed the various elements thereof (e.g. the air paths, dampers, airfilters, etc.).

Thus, in accordance with a more particular aspect, the present invention provides a ventilation apparatus wherein a fresh air path means, an exhaust air path means, a rotary exchanger wheel (and if present a non-rotating exchanger), and a defrost air path means, are disposed in a cabinet, and wherein said fresh air intake side, said exhaust air discharge side, said fresh air discharge side and said exhaust air intake side each includes one respective air opening in an outer wall of said cabinet.

A damper component for a ventilation apparatus as described herein may take any desired form whatsoever. A damper component may for example, comprise a first damper component and a second damper component. The first damper component may be displaceable between a ventilation configuration
wherein said defrost air path means is closed off and said fresh air intake side is open and
a defrost configuration
wherein said defrost air path means is closed off and said fresh air intake side is closed off the second damper component may be displaceable between
a ventilation configuration
wherein said exhaust air discharge side is open and
a defrost configuration
wherein said exhaust air discharge side are closed off.

During a ventilation cycle, for a ventilation apparatus comprising a rotary exchanger wheel, when said first and second damper components are in said respective ventilation configurations, fresh air is able to flow through said fresh air path means and exhaust air is able to flow through said exhaust air path means, and during a defrost cycle, when said first and second damper components are in said respective defrost configurations, defrost air taken from the building, is able to circulate, for delivery back into the building, through said exhaust air intake side, through said second air stream path, (defined by the rotary exchanger wheel) then through said defrost air path means, through said first air stream path, and through said fresh air discharge side.

A ventilation apparatus comprising a desiccant exchanger element and a sensible heat exchanger element may have first and second damper components as described above. In this case, during a defrost cycle, when the first and second damper components are in respective defrost configurations, defrost air taken from the building is able to circulate for delivery back into the building, through the exhaust air intake side, through the third air stream path (defined by the rotary wheel exchanger), through the fourth air stream path (defined by the sensible heat exchanger element), then through the defrost air path means, through the first air stream path (defined by the sensible heat exchanger element), through the second air stream path (defined by the rotary wheel exchanger), and through the fresh air discharge side.

In accordance with another aspect, the present invention provides for a defrostable ventilation apparatus, for exchanging interior air of a building with air exterior to the building, for transferring water moisture and sensible heat between exhaust air taken from the building and fresh air taken from the air exterior to the building, and wherein interior air taken from the building is used as defrost air to defrost the ventilation apparatus, said ventilation apparatus having fresh air path means having a fresh air intake side and a fresh air discharge side, exhaust air path means having an exhaust air intake side and an exhaust air discharge side, a rotary exchanger wheel for transfer of water moisture and sensible heat between said exhaust air and said fresh air, said exchanger wheel being configured and rotatably disposed so as to define a first air stream path and a second air stream path, said first air stream path defining a portion of said fresh air path means between the fresh air intake side and the fresh air discharge side thereof and said second air stream path defining a portion of said exhaust air path means between the exhaust air intake side and the exhaust air discharge side thereof, and a rotation component for inducing rotation of said exchanger wheel through said fresh air path means and said exhaust air path means, characterized in that said apparatus comprises defrost air path means for providing an air path by-passing said first air steam path, said defrost air path means comprising a defrost air discharge side and being configured to connect the exhaust air discharge side with the defrost air discharge side thereof for conveying defrost air to said defrost air discharge side from said exhaust air discharge side, and a damper component, said damper component being displaceable between a ventilation configuration for a ventilation cycle wherein said defrost air path means is closed off and said fresh air intake side and said exhaust air discharge side are open, and a defrost configuration for a defrost cycle wherein said fresh air intake side and said exhaust air discharge side are closed off and said defrost air path means is open, and wherein during a ventilation cycle, when said damper component is in said ventilation configuration, fresh air is able to flow through said fresh air path means and exhaust air is able to flow through said exhaust air path means, and during a defrost cycle, when said damper component is in said defrost configuration, defrost air taken from the building, is able to circulate, for delivery back into the building, through said exhaust air intake side, through said second air stream path, then through said defrost air path means, and through said defrost air discharge side.

As may be appreciated from the above, this other aspect of the present invention provides for the possibility of not having to adjust the speed of the rotating wheel for the purposes of a defrost cycle; speed adjustment could of course still be done if desired. For simplicity, however, the wheel may be allowed to continue to rotate at a speed which is normal for a ventilation cycle. In this case, since the defrost air is made to by-pass the fresh path defined by the rotating exchanger wheel the defrost air does not take heat back from the wheel prior to being returned to the building; in this way the possibility that the wheel may lose heat back to the defrost air sent back to the building is avoided.

In accordance with the present invention, a ventilation apparatus comprising the above mentioned desiccant exchanger element and a sensible heat exchanger element may include defrost air path means for providing an air path by-passing first and second air stream paths (defined respectively by the sensible heat and desiccant exchanger elements), the defrost air path means comprising a defrost air discharge side and being configured to connect the exhaust air discharge side with the defrost air discharge side for conveying defrost air to the defrost discharge side from the exhaust air discharge side, and wherein, during a defrost cycle where the damper component is in the defrost configuration, defrost air taken from the building is able to circulate for delivery back into the building through the exhaust air intake side, through the third air stream path (defined by the rotary exchanger wheel), through the fourth air stream path (defined by the sensible heat exchanger element), then through the defrost air path means, and through the defrost air discharge side.

In accordance with a by-pass type apparatus as described herein the defrost air path means may have its own independent outlet side for discharging air back to the building. Alternatively, the defrost air path means may not have such an independent outlet but may be coupled to the fresh air discharge side of the fresh air path means, i.e. a separate discharge opening for the returning air may be avoided. Thus a defrost air path means for providing an air path by-passing the first air steam path may be configured to connect the exhaust air discharge side with the fresh air discharge side for conveying defrost air to said fresh air discharge side from said exhaust air discharge side. In this later case, for a ventilation apparatus comprising a rotary exchanger wheel, during a defrost cycle, when the damper component is in said defrost configuration, defrost air taken from the building, is able to circulate, for delivery back into the building, through said exhaust air intake side, through said second air stream path (defined by the rotary exchanger wheel), then through said defrost air path means, and through said fresh air discharge side.

In accordance with a further general aspect the present invention provides a method for balancing fresh air and exhaust air flow through an operating ventilation apparatus, said ventilation apparatus being configured for exchanging interior air of a building (i.e. any enclosed space) with air exterior to the building and for transferring, a member of the group comprising i) sensible heat and ii) sensible heat and water moisture, between exhaust air taken from the building and fresh air taken from air exterior to the building, said ventilation apparatus comprising fresh air path means having a fresh air intake side and a fresh air discharge side, exhaust air path means having an exhaust air intake side and an exhaust air discharge side, an air-to-air exchanger body for exchanging, a member selected from the group comprising i) sensible heat and ii) sensible heat and water moisture, between fresh air and exhaust air, said exchanger body being configured and disposed so as to define a first air stream path and a second air stream path, said first air stream path defining a portion of the fresh air path means between the fresh air intake side and the fresh air discharge side thereof and said second air stream path defining a portion of said exhaust air path means between the exhaust air intake side and the exhaust air discharge side thereof, said method comprising determining a first static pressure difference in said fresh air path means, said first static pressure difference being determined with respect to first and second static pressure sampling locations, said first air stream path being disposed between said first and second static pressure sampling locations, determining a second static pressure difference in said exhaust air path means, said second static pressure difference being determined with respect to third and fourth static pressure sampling locations, said second air stream path being disposed between said third and fourth static pressure sampling locations, comparing a predetermined fresh air flow value corresponding to said first static pressure difference with a predetermined exhaust air flow value corresponding to said second static pressure difference so as to determine if said predetermined fresh air and exhaust air flow values are at least substantially equal.

In accordance with the above described balancing method the ventilation apparatus may include a first adjustable damper component for adjusting air flow through the fresh air path means, and a second adjustable damper component for adjusting air flow through the exhaust air path means.

If desired, however, such first and second adjustable damper components may as mentioned above be provided by the ductwork of the building to which the ventilator is connected or if desired or necessary be temporarily and removably inserted in the duct work by the balancing technician; in the latter case once balance is achieved the damper means are removed and replace with suitable duct pieces.

The balancing method of the present invention may, thus, for example, include manipulating at least one of said first and second damper components so that said so obtained first and second pressure differences are each set at a value whereby each pressure difference corresponds to a respective predetermined air flow value which is at least substantially equal to the predetermined air flow value corresponding to the other static pressure difference.

The air flow values may be predetermined as shall be explained below. The predetermined flow values may for example be arranged as flow input and output charts set forth by way of example below as charts I and II respectively; the flow values may of course be presented in any other desired fashion. The predetermined air flow values for various static pressure differences shown in the charts below may be consulted during balancing of an apparatus; the charts may for example be fixed to an appropriate surface of the apparatus for consultation by a technician balancing the apparatus. In the charts $\Delta P$ is the static pressure difference.

CHART II

FRESH AIR

| $\Delta P$ (inches water) | Flow rate (cfm) |
|---|---|
| 0.01 | 8 |
| 0.02 | 16 |
| 0.03 | 24 |
| 0.04 | 32 |
| 0.05 | 40 |
| 0.06 | 48 |
| 0.07 | 56 |
| 0.08 | 64 |
| 0.09 | 72 |
| 0.1 | 80 |
| 0.11 | 88 |
| 0.12 | 96 |
| 0.13 | 104 |
| 0.14 | 112 |
| 0.15 | 120 |
| 0.16 | 128 |
| 0.17 | 136 |
| 0.18 | 144 |

CHART I

EXHAUST AIR

| $\Delta P$ (inches water) | Flow rate (cfm) |
|---|---|
| 0.02 | 7 |
| 0.04 | 14 |
| 0.06 | 21 |
| 0.08 | 27 |
| 0.1 | 34 |
| 0.12 | 41 |
| 0.14 | 48 |
| 0.16 | 55 |
| 0.18 | 62 |
| 0.2 | 68 |

CHART I-continued

EXHAUST AIR

| ΔP (inches water) | Flow rate (cfm) |
| --- | --- |
| 0.22 | 75 |
| 0.24 | 82 |
| 0.28 | 96 |
| 0.3 | 103 |
| 0.32 | 110 |
| 0.34 | 116 |
| 0.36 | 123 |
| 0.38 | 130 |
| 0.4 | 137 |
| 0.42 | 144 |

In accordance with a further aspect, the present invention provides an additional type of ventilation apparatus, for exchanging interior air of a building (i.e. any enclosed space) with air exterior to the building, and for transferring, a member of the group comprising i) sensible heat and ii) sensible heat and water moisture, between exhaust air taken from the building and fresh air taken from air exterior to the building for delivery to the building, said ventilation apparatus comprising fresh air path means having a fresh air intake side and a fresh air discharge side, exhaust air path means having an exhaust air intake side and an exhaust air discharge side, exchanger means for exchanging, a member selected from the group comprising i) sensible heat and ii) sensible heat and water moisture, between fresh air and exhaust air, said exchanger means being configured and disposed so as to define a first air stream path and a second air stream path, said first air stream path defining a portion of the fresh air path means between the fresh air intake side and the fresh air discharge side thereof and said second air stream path defining a portion of said exhaust air path means between the exhaust air intake side and the exhaust air discharge side thereof, characterized in that said apparatus comprises first, second, third and fourth static pressure taps, said first and second static pressure taps being configured and disposed for the determination of a first static pressure difference therebetween in said fresh air path means, said first air stream path being disposed between said first and second static pressure taps, said third and fourth static pressure taps being configured and disposed for the determination of a second static pressure difference therebetween in said exhaust air path means, said second air stream path being disposed between said third and fourth static pressure taps.

In accordance with the present invention a ventilation apparatus may advantageously comprise first adjustable damper component for adjusting air flow through the fresh air path means, and a second adjustable damper component for adjusting air flow through the exhaust air path means; the presence of such dampers in the ventilator itself will eliminate the necessity of the balancing technician from having to install dampers and remove them as necessary.

In accordance with the present invention, the static pressure taps may be configured in any desired manner whatsoever, provided that they facilitate the taking of static pressure readings; e.g. the pressure is measured near the wall of the duct means defining an air path, i.e. the pressure connection terminates at least substantially flush with the wall of the duct means defining the air path.

In accordance with the present invention the exchanger means for a balanceable ventilation apparatus may take any desired form. The exchanger means may for example take the form of one or more (air-to-air) rotary and/or stationary exchanger cores or elements such as described herein. Thus, the exchanger means may comprise an exchanger body such as, for example, a rotary exchanger wheel or box like parallel channel exchanger as described above.

In accordance with the present invention the first adjustable damper component may for example, be disposed on the fresh air discharge side of the fresh air path means, and the second adjustable damper component may be disposed on the exhaust air intake side of the exhaust air path means.

The first and second static pressure taps may each comprise a static pressure sampling aperture defined by a wall of the fresh air path means and the third and fourth pressure tap means may each comprise a static pressure sampling aperture defined by a wall of the exhaust air path means.

The ventilation apparatus may be configured as a constant flow ventilation apparatus; i.e. an apparatus wherein during the ventilation and defrost cycles the air flow is intended to be more or less constant (i.e. not be manipulated up or down).

For a balanceable ventilation apparatus the fresh air path means, the exhaust air path means, and the heat exchanger body may be disposed in a cabinet, wherein said fresh air intake side, said exhaust air discharge side, said fresh air discharge side and said exhaust air intake side each includes one respective air opening in an outer wall of said cabinet, wherein said first and second pressure taps each comprise a pressure sampling aperture defined by a wall of said fresh air path means and wherein said third and fourth pressure taps each comprise a pressure sampling apertures defined by a wall of said exhaust air path means. In accordance with the present invention, the fresh air path means comprises a wall of said cabinet which defines said apertures of said first and second pressure tap means, and the exhaust air path means comprises a wall of said cabinet which defines said apertures of said third and fourth pressure tap means.

For any ventilation apparatus as described herein fan means for moving air through the air paths thereof may be disposed outside the apparatus (i.e. the fans may form part of the overall ventilation ductwork of the building). Alternatively, fan means may be integrated within a ventilation apparatus itself, the latter being preferred; i.e. a ventilation apparatus may be configured such that the fresh air path means includes a fan for moving fresh air through said fresh air path means and the exhaust air means includes a fan for moving exhaust air through said exhaust air path means, such fans forcing air to pass through the first and second air stream paths. A ventilation apparatus, for example, may comprise a blower assembly having motor(s), blower wheels, blower housings, etc. . . . The blower assembly may have a single motor; two blower wheels may in this case be mounted directly on the shaft of such motor. The blower assembly may also include separate blower housings for each of the blower wheels, with one blower wheel being disposed in each of the fresh air and exhaust air paths. Thus for example, an above described apparatus may include a fan mounted in an above mentioned cabinet for moving fresh air through said fresh air path means and for moving exhaust air through said exhaust air path means, said fan comprising one motor and two blower wheels operatively connected thereto, said fresh air path means including one said blower wheel and said exhaust path means including the other said blower wheel. The ventilation apparatus may of course include a separate motor for the fresh air and for the exhaust air blower assembly.

Any ventilation apparatus may also be provided with air filters for each of the air paths.

Any ventilator of the present invention may, for example, as desired or necessary, be provided with one or more of exchanger elements or cores such as previously described herein. Desiccant wheels which may be used include those for example sold by Munters CargoCaire or Semco as mentioned previously. Sensible heat wheels which may be used include those for example sold by Semco Inc. Sensible non-rotating heat exchange cores which may be used include those as described in the above mentioned patents.

The nature and construction of the various elements of an apparatus in accordance with the present invention will of course depend on the volumes of air it is desired to handle and the heat recovery efficiency.

In accordance with the present invention a ventilation apparatus may, if desired, include both defrosting means and air flow balancing as described herein.

Keeping the above in mind, the present invention will be particularly described by reference to the accompanying drawings which illustrate example embodiments of the present invention.

DESCRIPTION OF THE DRAWINGS

FIG. 1 is a schematic perspective view of a cabinet comprising a ventilation apparatus, in accordance with the present invention, which includes both defrosting means and means for balancing air flow;

FIG. 2 is a schematic perspective view of the cabinet of the apparatus shown in FIG. 1 but with the top cover wall and the front door removed and the interior components not shown;

FIG. 3 is a schematic front view showing the air paths of the ventilation apparatus of FIG. 1 when the apparatus is in a ventilation configuration for a ventilation cycle (only the rotary exchanger wheel is shown in place);

FIG. 4 is a schematic front view showing the air paths of the ventilation apparatus of FIG. 1 when the apparatus is in a defrost configuration for a defrost cycle (only the rotary exchanger wheel is shown in place);

FIG. 9 is a schematic drawing of the exhaust air blower housing and blower wheel of the apparatus of FIG. 1 illustrating a combination damper/wall element for directing exhaust air flow on the exhaust side of the exhaust air path means and means for displacing the damper/wall element and a fresh air inlet damper so as to control exhaust and fresh air flow;

FIG. 10 is a schematic view of a motor/rod means for displacing the damper/wall element and the fresh air damper shown in FIG. 9 between a ventilation and defrost position;

FIG. 11 schematically shows another embodiment of the present invention similar to that shown in FIG. 6 but wherein a second motor is provided to urge rotation of the exchanger wheel at a lower defrost rotation speed than the ventilation speed;

FIG. 12 is a schematic perspective view of a Prior Art setup for balancing a ventilation apparatus connected to the ductwork of a building;

FIG. 13 is a schematic perspective view of a Prior Art manometer for taking pressure difference readings;

FIG. 15 is a sectional view along line 15-15 of FIG. 5;

FIG. 16 is a sectional view along line 16-16 of FIG. 5;

FIG. 21 is a schematic illustration of an arrangement for determining the predetermined pressure co-related calibration air flows for an apparatus shown in FIG. 1

FIG. 26 is a general schematic illustration of an example of a defrostable ventilation apparatus using a by-pass technique for the apparatus;

FIG. 27 is a schematic illustration of an example of a by-pass defrostable ventilation apparatus exploiting elements common with the apparatus shown in FIGS. 1 to 10.

In the drawings like reference characters indicate corresponding parts in the different figures.

DETAILED DESCRIPTION

Figure 5:
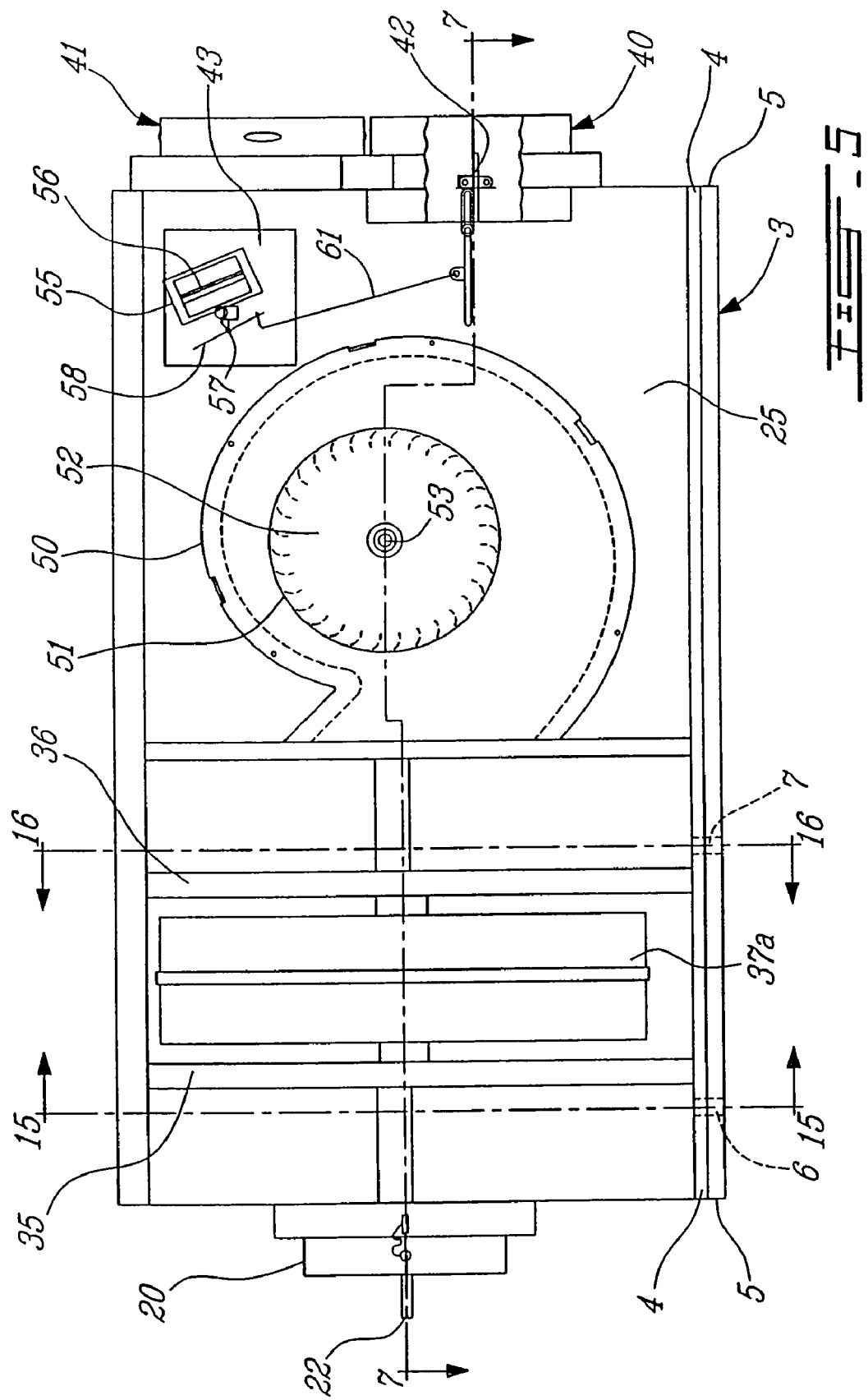
FIG. 5 is a top view of the apparatus shown in FIG. 1 but wherein the top outer wall of the apparatus has been removed.

FIG. 1 shows a ventilation apparatus of the present invention which includes both a defrost means and air flow balancing means.

The apparatus shown in FIG. 1 includes a cabinet indicated generally by the reference number 1. The cabinet 1 is preferably provided with insulated walls and partition wall members.

The cabinet 1 has a top outer wall 2 and a front door 3. The door 3 is of composite construct comprising a sheet metal outer element 4 and an inner element 5. The inner element 5 is of sheet foam material and is sized to cover the entire inner surface of the element 4. The foam element 5 acts to provide an airtight seal for the door along its periphery adjacent the other walls of the cabinet; element 5 also acts as a heat insolation member. Although not shown, the door may be hingedly attached to hinge members and may be kept shut for example by snap locking members which cooperate with members on the door; see for example U.S. Pat. No. 5,193, 610.

The cabinet 1 is provided with pressure tap openings 6, 7, 8, and 9; their function will be discussed below with respect to the air flow balancing aspect of the apparatus.

Turning to FIG. 2 the cabinet 1 is shown with the top 2 and front door 3 removed; the interior ventilation elements are also not shown in order to better illustrate the major partitioning wall members of the cabinet which generally define the fresh air and exhaust air paths. The cabinet 1 is provided with four end wall openings, namely wall openings 10, 11, 12 and 13; a pair of wall openings being disposed in opposed end walls 14 and 15. As may be seen the opening 10 and 11 are more or less disposed such that opening 10 is vertically in line with and above opening 11. Opening 12 on the other hand is disposed so as to be adjacent the door 3 whereas the opening 13 is rearwardly disposed adjacent the rear wall of the cabinet 1; i.e. openings 12 and 13 are not vertically aligned.

Referring back to FIG. 1, duct connector members 20 and 21 are disposed about respective openings 10 and 11. Each of these duct connector members is provided with respective adjustable circular plate damper elements 22 and 23. The adjustable damper elements 22 and 23 are each configured and pivotally disposed such that each may be manually rotated about a vertical axis between a closed position wherein the major surfaces of the damper are perpendicular to the air flow (i.e. the openings 10 and 11 are essential closed off) and a fully open position wherein the dampers are disposed such that the major surfaces are parallel to the air flow, i.e. the air hits the damper elements edgewise such that the openings 10 and 11 are essentially not obstructed thereby. In FIG. 1 the damper elements are shown in edgewise disposition with respect to the flow of air. These adjustable damper elements may be used to balance fresh and exhaust air flow through the ventilator apparatus as shall be discussed below. Although the ventilation apparatus is shown with these damper elements 22 and 23 they may if desired not be part of the apparatus as shown and thus not be present. In this case, however, if desired the adjustable damper elements may form part of the overall duct work to which the apparatus is ultimately to be connected to in order to facilitate airflow balancing as shall be discussed below.

Turning back to FIG. 2, the cabinet is provided with a longitudinally extending central partitioning member 25. This partitioning member 25 along with the exterior walls of the cabinet (including the front door 3) partition the interior of the cabinet 1 into an upper interior half and a lower interior half. The upper interior half of the cabinet, with the door 3 in place, defines the fresh air path means for the fresh air; i.e. during a ventilation cycle, fresh air may enter opening 12 and exit opening 10 as shown by the air flow arrow 26. The lower half of the cabinet, again with the door 3 in place, defines the exhaust air path means for the exhaust air; i.e. during a ventilation cycle, exhaust air may enter opening 11 and exit opening 13 as shown by the air flow arrow 27.

The partitioning member 25 is also provided with opening 30, 31 and 32.

The opening 30 is present so as to accommodate a rotary exchanger wheel such that approximately half of the wheel will project into each of the lower and upper interior halves of the cabinet.

Referring briefly to FIGS. 15 and 16, a pair of opposed baffle members 35 and 36 are disposed on respective sides of the rotary exchanger wheel 37 in the upper interior half of the cabinet and a pair of baffle members 38 and 39 are disposed on respective sides of the rotary exchanger wheel 37 in the lower interior half of the cabinet. The baffle members 35, 36 and 38 and 39 serve to channel air in the upper and lower interior halves of the cabinet essentially solely through respective upper and lower semi-circular portions 37a and 37b of wheel 37 which extends into the upper and lower interiors of the cabinet 1; the axis of rotation of the wheel lies more or less parallel to and passes through the partition member 25. These baffles may also be seen for example in FIGS. 4 and 5.

A single heat exchange element or (heat recovery) core 37 is shown in the figures as being suitably mounted in the cabinet 1. Although one such core 37 is shown it will nevertheless be appreciated that two or more such cores may, if desired, be used either in series or in parallel, provided that appropriate modifications are made to the partitioning members so as to accommodate the required air flow patterns.

Referring back to FIG. 2, the opening 31 is configured so as to seat an electric blower motor such that the motor is disposed in the upper interior half of the cabinet and allow at least the shaft of the blower motor to extend therethrough so as to engage a blower wheel disposed in a lower blower housing.

The opening 32 is present so as to provide for air communication between the upper and lower interior halves of the cabinet during a defrost cycle.

Referring now to FIGS. 3 and 4, these show, in a general schematic manner, the disposition of the flow of air through the rotary heat exchange element or core 37 of the apparatus of FIG. 1 during the ventilation and defrost cycles.

FIG. 3 illustrates the air paths when the apparatus is operating in a ventilation cycle.

FIG. 4 illustrates the air path when the apparatus is operating in a defrost cycle.

As seen in FIGS. 3 and 4 the apparatus has additional duct connector members 40 and 41 which are disposed about respective openings 12 and 13. The duct connector member 40 is provided with a circular plate damper element 42; this damper element may be urged to block off or open the opening 12 in a manner similar to the operation of damper elements 22 and 23 mentioned above. The damper element 42 is configured and pivotally disposed such that it may be rotated by a motor (as shall be explained below) about a vertical axis between a closed position wherein the major surfaces of the damper are perpendicular to the air flow (i.e. the opening 12 is essential closed off) and a fully open position wherein the damper element 42 presents an edge to the air flow.

As may be seen from FIG. 4, the opening 32 in the partition member is open or unobstructed and the exhaust air may flow back through the upper portion 37a of the wheel for return to a building. On the other hand, in FIG. 3 the opening 32 in the partition member 25 is shown as being blocked off by a suitably configured and sized damper element 43 such that the exhaust air is directed out of opening 13. Thus damper element 43 is shown in FIG. 3 in a ventilation configuration and in FIG. 4 in a defrost configuration. The apparatus is provided with a lower blower assembly having a blower housing (not shown) which communicates with the opening 13 for the expulsion of exhaust air via a short channel; a lower wall part of this short channel is designated by the reference numeral 45 in FIGS. 3 and 4. The damper element 43 is suitably pivoted along one edge such that it may pivot downwardly into a defrost position or configuration as shown in FIG. 4; i.e. the damper element 43 is pivotally connected in any suitable or desired fashion at edge 46 so as to be able to be displaceable between the ventilation and defrost configurations (e.g. by a pin and sleeve combination such as used for a door hinge). The damper element 43 is suitably configured and sized such that when it is in the defrost configuration shown in FIG. 4 the damper element 43 leaves open, opening 32, but blocks off the air path defined by the above mentioned short channel such that exhaust air is not able to flow to the opening 13. During the defrost cycle the damper element 42 blocks off the fresh air path communicating with the opening 12.

Although FIG. 3 shows an interior opening 32 for connecting the upper and lower interior portions of the cabinet, the opening may if desired be configured as a channel which is defined on the outside of the cabinet and which is connected thereto through suitable openings on the walls defining the lower and upper interior portions of the cabinet. In this case the damper element 43 would have to be suitably reconfigured to be able to block off or open this outside channel.

The apparatus of FIG. 1 as shown in FIGS. 3 and 4 has a total of three possible unobstructed air paths. The air paths in use depend on the operating cycle of the apparatus. There are two air paths during a ventilation cycle, namely a fresh air path and an exhaust air path. On the other hand, there is one air path during the defrost cycle, namely the air path whereby defrost interior air is able to flow or circulate through the lower and upper interior parts of the apparatus for delivery back into a building.

Thus, in the ventilation configuration shown in FIG. 3 there are two main air path elements, namely the air paths designated by the air flow arrows 26 and 27. The air path defined by the arrows 26 delivers fresh air to the heat recovery core portion 37*a* and delivers fresh air which has passed through the heat recovery core portion 37*a* to the interior of the building. The air path defined by the arrows 27 on the other hand delivers exhaust or stale air from a building to the heat recovery core portion 37*b* and exhausts, to the exterior of the building, the stale air which has passed through the heat recover core portion 37*b*.

Referring to FIG. 4 the apparatus is illustrated as being in a defrost configuration having a defrost air path designated by the air path arrows 27*a*. In the configuration of FIG. 4 no fresh air is introduced into the building and building air is allowed to circulate through the upper and lower portions 37*a* and 37*b* of the wheel 37 for delivery back to the interior of the building; in this way the wheel 37 may be defrosted without inducing any substantial negative air pressure in the building.

Referring now to FIGS. 5, 6, 7, 8 and 14, these figures schematically show the apparatus of FIG. 1 in a ventilation configuration for a ventilation cycle as illustrated in FIG. 3.

FIG. 5 shows the apparatus of FIG. 1 wherein the top upper wall has been removed so as to generally expose in more detail the ventilator elements of the upper interior half of the cabinet. Thus can be seen a blower housing 50, a blower wheel 51 disposed in the housing 50, a (fresh) air inlet opening 52 in the blower housing 50 disposed below the blower wheel 51, and a motor shaft portion 53 to which the blower wheel 51 is attached.

As seen from FIGS. 5, 6, 7, 8 and 14, a support bracket 55 is fixed to and extends perpendicularly down from the top wall 2. A motor 56 is fixed to the bracket 55. The motor 56 has a shaft 57 which is fixed to a rocker or actuation arm means 58 (here, by way of example, in the form of a circular plate). The rocker arm means rotatably engages one end of rods 60 and 61; i.e. bent over ends of the rods 60 and 61 are rotatably engaged by respective openings in the rocker arm means 58. The other end of rod 60 is hingely attached to the damper element 43; the other end of the rod 61 is similarly rotatably/hingeably attached to the damper element 42. As illustrated the rods and corresponding damper elements are in a ventilation configuration. Rotation of the rocker arm means 58 by the motor 56 will cause the rods to pull/push the damper elements into respective defrost configurations; a more detailed explanation will be provided below with respect to FIGS. 9 and 10.

Figure 7:
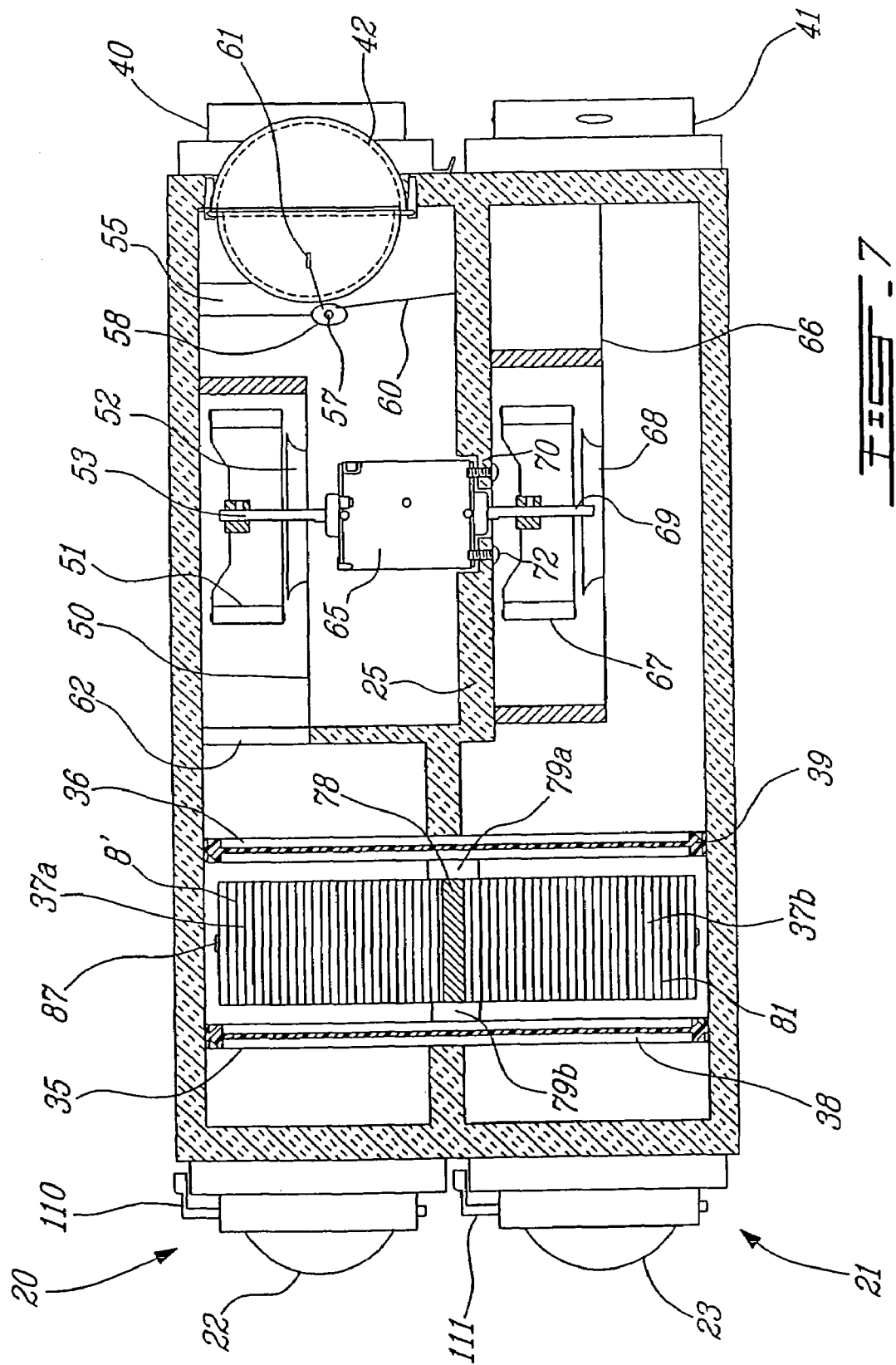
FIG. 7 is a sectional view along line 7-7 of FIG. 5.
Figure 8:
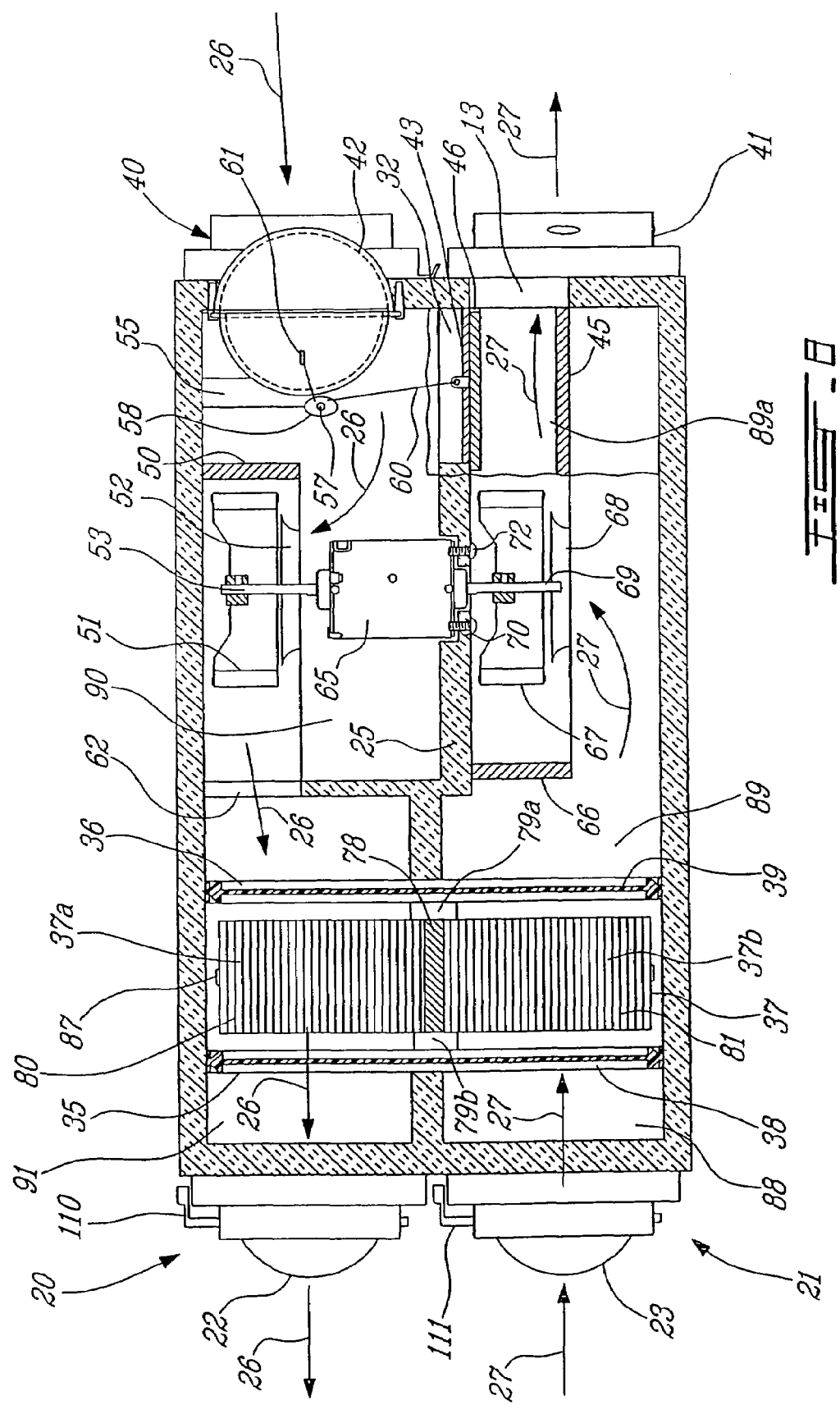
FIG. 8 is the same view as shown in FIG. 7 but with a portion of a partition wall means separating the exhaust outlet side from the fresh air inlet side being partially cut away.
Figure 14:
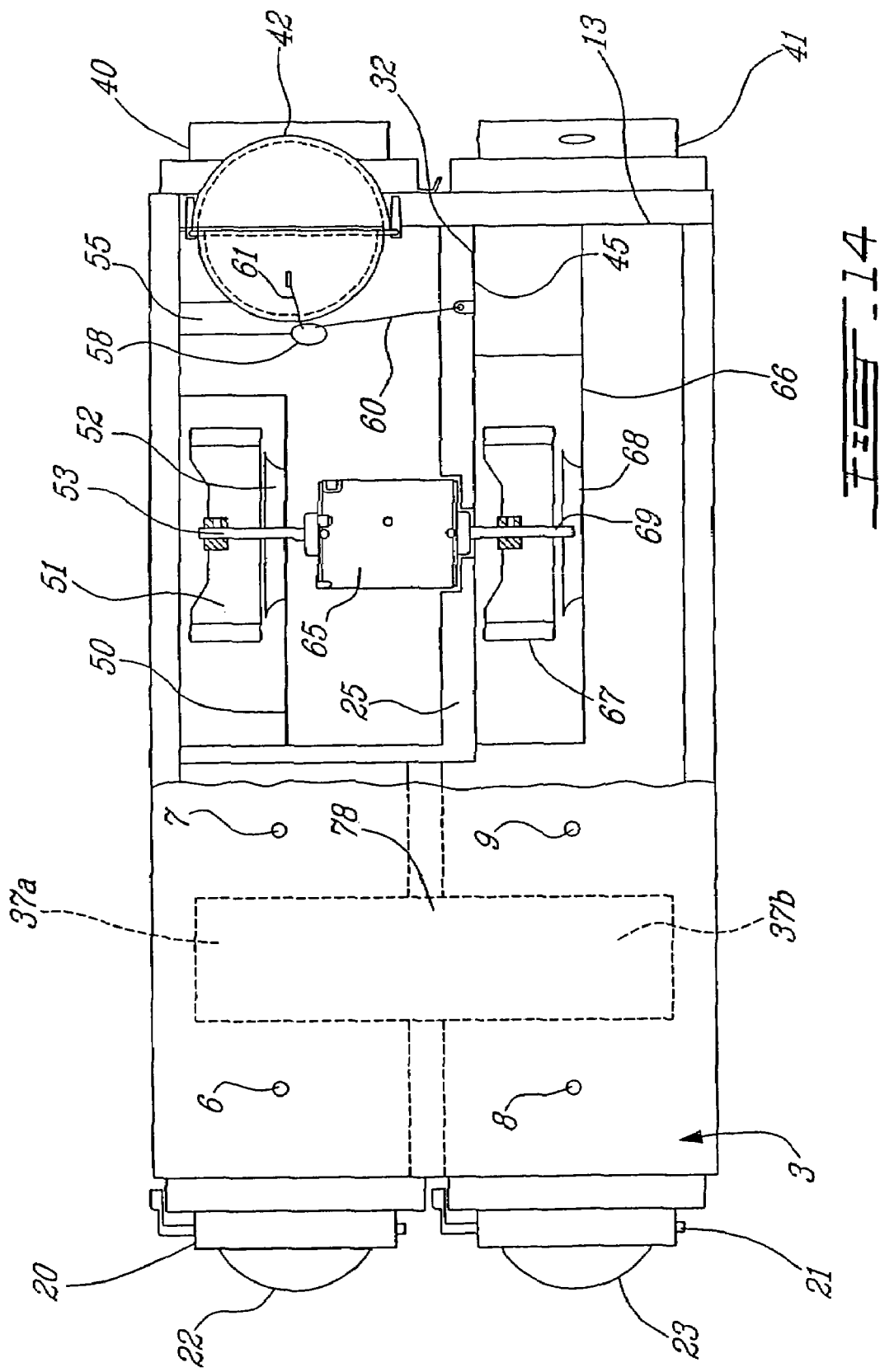
FIG. 14 is schematic illustration of the same view as shown in FIG. 8 but with the front door in place showing the disposition of pressure taps on either side of the exchanger wheel, the front door being partially cut away and this figure appearing on the same sheet of drawings as FIG. 5.
Figure 17:
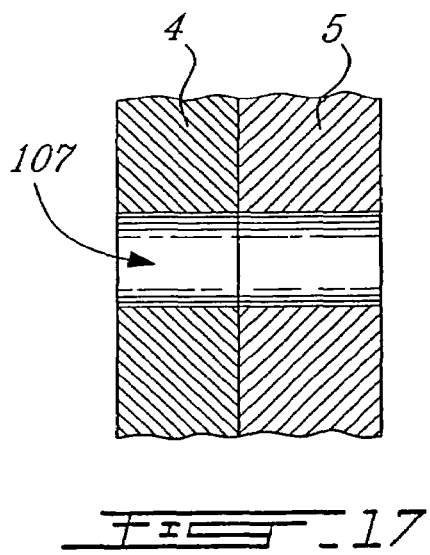
FIG. 17 is a partial schematic view of the front door of the apparatus of FIG. 1 showing in section an example pressure tap opening passing through the door.
Figure 18:
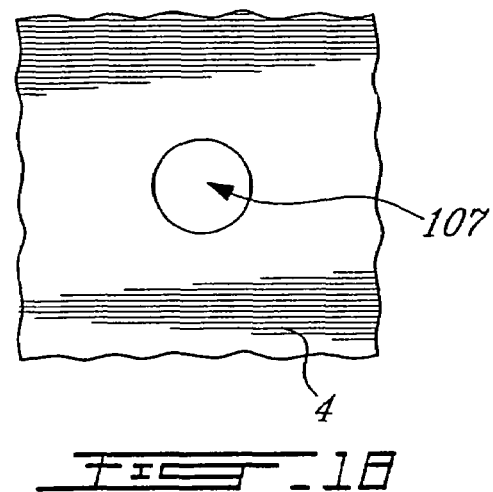
FIG. 18 is a partial schematic view of the inner side of the front door of the apparatus of FIG. 1 showing the mouth of the pressure tap opening shown in FIG. 17.
Figure 19:
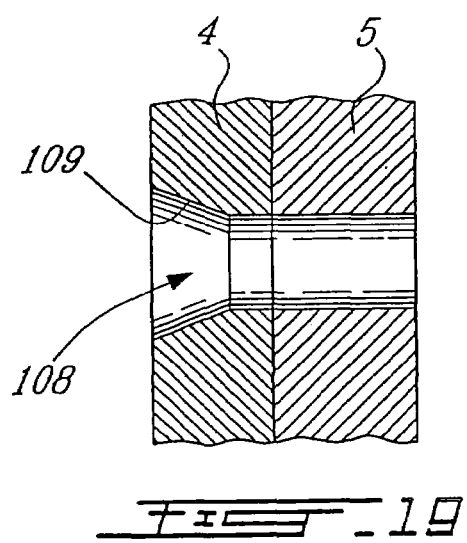
FIG. 19 is a partial schematic view of the front door of the apparatus of FIG. 1 showing in section an alternate bevelled pressure tap opening configuration passing through the door.
Figure 20:
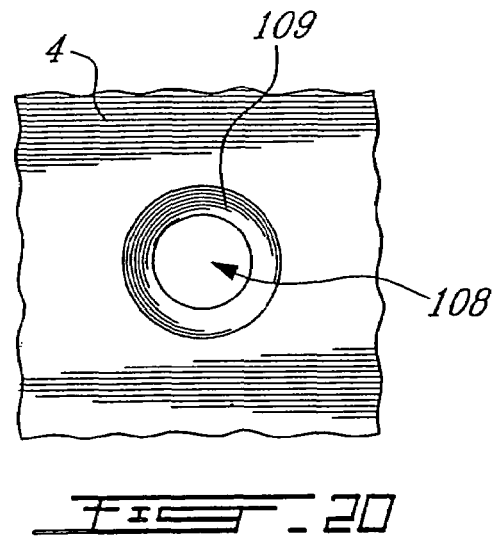
FIG. 20 is a partial schematic view of the inner side of the front door of the apparatus of FIG. 1 showing the mouth of the pressure tap opening shown in FIG. 19.

The blower housing 50 has a lateral (fresh) air outlet opening 62 (see FIGS. 7 and 8).

The upper interior half of the cabinet 1 includes a motor 65.

The lower interior half of the cabinet 1 includes a blower housing 66, a blower wheel 67 disposed in the housing 66, an (exhaust) air inlet opening 68 in the blower housing 66, and a motor shaft portion 69 to which the blower wheel 67 is attached. As may be seen the two blower wheels 51 and 67 are disposed on opposite sides of the motor 65 and are mounted directly on corresponding shaft portions 53 and 69 of the shaft of the motor 65.

The blower housings 50 and 66 may be made of an expanded polystyrene material.

The motor 65 is seated in opening 31 in the partitioning member 25. The opening 31 is large enough to allow an end of the motor to pass partway therethrough but is provided with a shoulder rim 70 sized to stop or impede the passage of the motor into the interior of the housing 66; if desired or necessary, however, any suitable sealing gasket means may be disposed around the motor (and shaft 69) in the hole 31 so to provide an airtight seal. The motor 65 is rigidly joined to the shoulder 70 of opening 31 by a suitable fixation means (such as nut/bolt means 72). The ceiling of the blower housing 66 as may be appreciated is defined by a portion of the partition member 25.

Reference will now be made to FIGS. 9 and 10. As mentioned above the damper members or elements 42 and 43 are displaced between respective ventilation and defrost configurations by means of a motor and rod arrangement; the motor-rod arrangement may take a form analogous to that of the motor-rod assembly shown in FIG. 2*c* of U.S. Pat. No. 5,193,610. Thus, the motor-rod arrangement includes a spring member for biasing the damper members or elements 42 and 43 in one configuration, the motor 56 being used to displace the damper members or elements to the other configuration.

FIG. 9 shows the lower blower housing 66 with the ceiling as defined by the partition member 25 removed so as to expose the blower wheel 67. As shown the damper member 43 is shown in place pivotable about edge 46; as shown the damper 43 is configured and disposed so as to block opening 32; the damper 43 is however also configured and sized such that if it is pivoted downwardly into the short channel member connecting the housing 66 to the opening 13 the short channel member is blocked and exhaust air is free to circulate upwardly through the unobstructed opening 32 into the upper interior part of the cabinet.

Referring to FIG. 10 the motor-rod assembly is shown in more detail. Thus the motor 56 has a shaft 57 which is fixed to rocker arm means 58; the motor is fixed to the bracket 55 in any suitable manner; the bracket 55 in turn is suitably fixed to the top wall 2. One end of the rod 60 has a bent over end 75 which is rotatably disposed in a hole in the rocker arm means 58 while the other end of rod 60 has a loop member which is hingedly fixed to the damper element 43. One end of the rod 61 has a bent over end 76 which is also rotatably disposed in a hole in the rocker arm means 58 while the other end of rod 61 has a bent over end 77 which is similarly rotatably fixed to damper element 42; i.e. via a small plate/hole member fixed to the damper member. A spring member (not shown) in the form of a (helical) coil spring is disposed around the shaft 57;

one end of the coil spring is fixed with respect to the motor and the other end is fixed to the actuating or rocker arm means 58 so as to bias the damper members 42 and 43 with respect to a respective ventilation configuration. Activation and deactivation of the motor 56 will thus cause the dampers 42 and 43 to be displaced between the ventilation and defrost configurations. Any suitable motor (such as for example a synchronous motor as made by Hansen Manufacturing Company, Inc.) may for example be used for this purpose. Any other suitable damper mechanism may of course be used, keeping in mind that the purpose of the damper is to block off the appropriate air path for the ventilation cycle and the defrost cycle while leaving the other necessary air paths unobstructed.

Referring back to FIGS. 6, 7 and 8, the exchanger wheel 37 may be a desiccant type exchanger wheel for transferring sensible heat and water moisture between air streams. The exchanger wheel 37 is rotationally supported in the interior of the cabinet 1 in any known manner so as to be able to effect an exchange of sensible and latent heat between fresh air and exhaust air; i.e. in the latter case an exchange of water moisture. Thus, the exchanger wheel 37 has an axle member 78; the axle member 78 is supported by suitable bearing members 79a and 79b such that the axle 78 is more or less parallel to the partition member 25. The bearing members 79a and 79b facilitate rotation of the rotary exchanger 37 through the upper and lower halves of the interior of the cabinet. The first air stream path mentioned above is defined by a plurality of parallel channels in the upper portion 37a of the exchanger wheel one of which is shown designated by the reference number 80; similarly the second air stream path mentioned above is also defined by a plurality of parallel channels in the lower portion 37b of the exchanger wheel one of which is shown designated by the reference number 81. These channels in the example wheel shown are parallel to the axle 78. The open ends of the channels of the upper and lower portions of the wheel 37 may be seen in FIGS. 15 and 16; the wheel is in other words permeable to air along the axis of rotation thereof. As can be appreciated as the wheel 37 rotates a channel initially defining a portion of the first air stream path will eventually define a portion of the second air stream path and so on.

Figure 6:
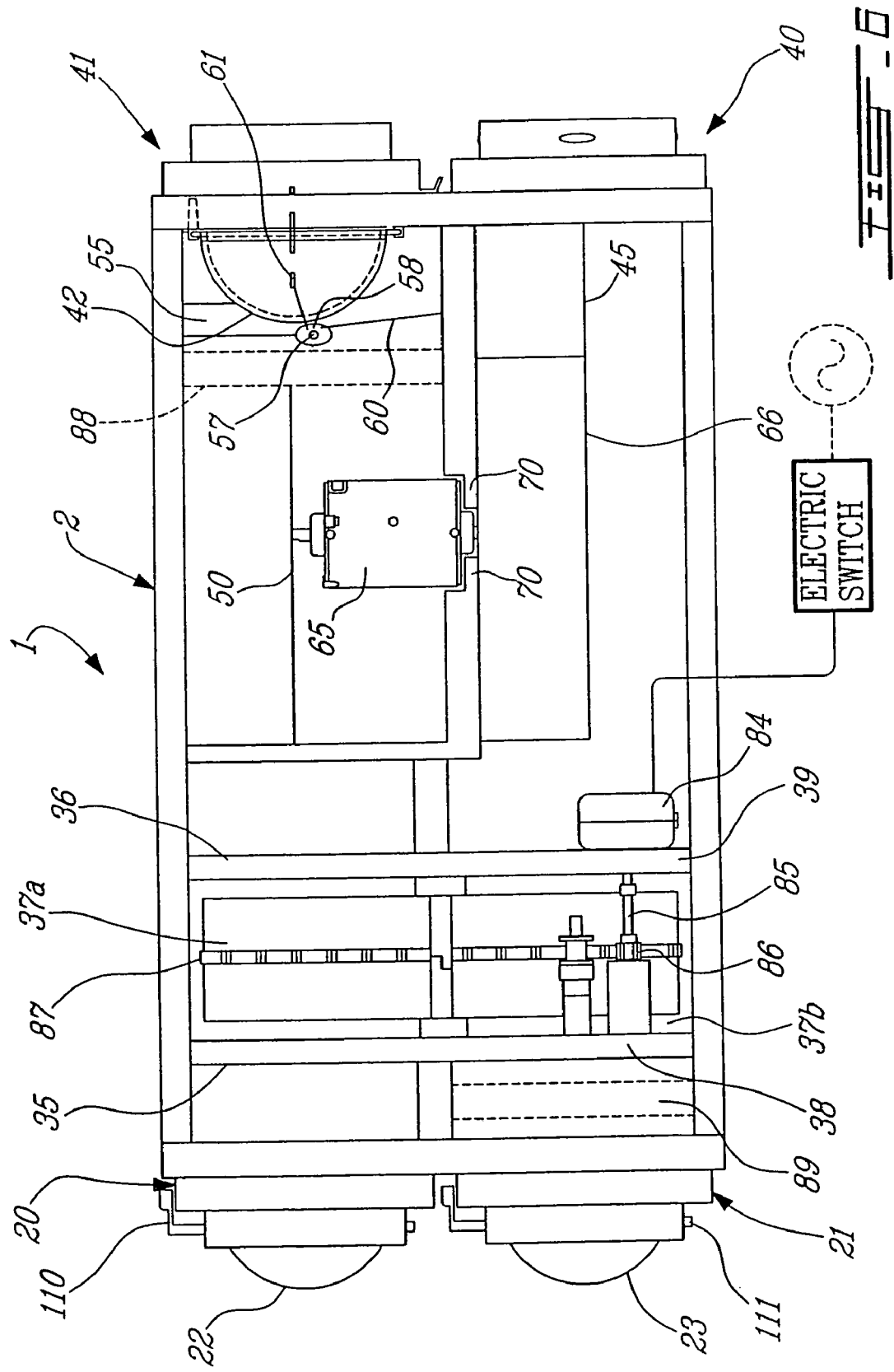
FIG. 6 is a front view of the ventilation apparatus shown in FIG. 1 with the front door of the cabinet removed.

Referring to FIG. 6, rotation of the wheel 37 is induced by the motor 84 which turns a shaft 85. The shaft 85 in turn rotates a pulley body 86 which engages a belt 87. The belt 87 surrounds a substantial part of the periphery of the wheel 37 and engages the exterior surface of the wheel 37 sufficiently such that it induces the wheel 37 to rotate about the above mentioned axle 78 in response to rotation of the shaft 85.

In FIG. 8, the apparatus as previously mentioned is shown as being in a ventilation configuration. In this configuration, during a ventilation cycle the fan means operate such that:
  exhaust air will proceed from the opening 11 into the lower left air pocket 88 (i.e. the exhaust air intake side of the exhaust air path means of the ventilation apparatus) in the direction of the arrow 27; the exhaust air will then pass through the parallel channels 81 of the rotating core into the lower right air pocket 89 in the direction of the arrow 27; the exhaust air will pass through the opening 68 of the exhaust blower housing 66 and into the air pocket 89a defined by the previously mentioned short channel (i.e. the exhaust air discharge side of the exhaust air path means of the ventilation apparatus) and thence to be ejected out of opening 13 as seen by arrow 27.
  fresh air will proceed from through the opening 12 into the right upper air pocket 90 (i.e. the fresh air intake side of the fresh air path means of the ventilation apparatus) in the direction of the arrow 26; the fresh air will then pass through the opening 52 of the fresh air blower housing 50 through the outlet opening 62 into the channels 80; the fresh air will then pass through the upper portion 37a of the wheel 37 into the left upper air pocket 91 (i.e. the fresh air discharge side of the fresh air path means of the ventilation apparatus) and out of the opening 10 in the direction of the arrow 26 for delivery to the interior of the building.

If a defrost cycle is desired the arm means 58 is rotated by the motor 56 so as to descend the damper element 43 so as to open or unblock the opening 32 while at the same time blocking off the exhaust air outlet opening 13; i.e. the damper element 43 is displaced so as to connect the air pockets 89a and 90. At the same time the damper element 42 is rotated so as to block off the fresh air inlet opening 12. The interior air of the building can then circulate through the upper and lower portions of the wheel 37 so as to effect a defrost of the wheel. Thus, during a defrost cycle, the interior defrost air may circulate through portions of both of the fresh air and exhaust air paths of the defrostable ventilation apparatus for delivery back into the building, i.e. the warm interior air may be confined to circulate from the interior of the building into the ventilation apparatus and back to the interior of the building.

During the above described ventilation cycle the motor 84 will be energized so as to induce ventilation rotation of the wheel 37 (e.g. a rotation of about from 15 to 18 rpm). During the defrost cycle, however, the rotation of the wheel 37 is stopped by switching off the current to the motor by means of an electric switch shown in FIG. 6 by way of a block element, the switch being connectable to a source of electric energy shown in dotted outline. Turning the switch on or off will effect energizing and de-energizing of the motor 84 as desired. Any switch suitable for the purpose may of course be used. During the ventilation and defrost cycles the blower motor is of course in an energized state so as to urge air through the apparatus. It has for example been found that with an exterior air temperature of −15° C. and a ventilation cycle time period of 32 minutes, that the defrost time may be 6 minutes with the wheel stopped.

Referring to FIG. 11, this figure illustrates an apparatus which is essentially the same as that as shown in FIG. 6 so the same reference numbers refer to the same elements. However, the apparatus additionally includes a defrost rotation component in the form of a second electric motor 84a, a shaft 85a, the shaft 85a engaging a pulley body 86a which also engages the belt 87; the apparatus also includes an electric switch shown as a block element for energizing and de-energizing the motor 84a; this second switch is likewise connectable to an electrical energy source (shown in dotted outline) as is the previously mentioned switch for motor 84. For this apparatus the motor 84 is configured so as to be able to urge rotation of the wheel 37 at a ventilation rotation speed (e.g. 18 rpm); the motor 84a on the other hand is configured so as to be able to urge rotation of wheel 37 at a defrost rotation speed (e.g 2 rpm, 1 rpm, etc). During a ventilation cycle the motor 84 is activated while the motor 84a is stopped or de-energized; during a defrost cycle the motor 84a is active and the motor 84 is deactivated. The switches may if desired be separate switches but for ease of use they may be embodied in a single switch configured such that in one position motor 84 is energized and motor 84a is de-energized and in another position the reverse occurs. Thus as may be appreciated the exploitation of such an apparatus entails the exploitation of the defrost method of the present invention wherein the rotational speed of the wheel is reduced during a defrost cycle. It has been, for example, found that with an exterior temperature of −15° C. and a ventilation cycle time period of 32 minutes that a defrost rotation of 2 rpm or less gives rises to a defrost time period of 8 minutes or less (i.e. at 2 rpm the defrost time is 8 minutes).

The cabinet for an apparatus as described herein may also, if desired, include appropriate temperature sensor(s), air filters, electric wiring, control mechanisms for controlling the various motors for the ventilation and defrost cycles, etc. (none of which is shown in the figures but which can be provided in any suitable or desired conventional manner). These mechanism may, for example, include programmable computer type controls. The controls may for example include a stepper control mechanism whereby the air flow rate may be passed from a high value, to a medium value, to a low value etc.; during these values the flow rate is intended to be more or less constant. The defrost cycle for example may normally be triggered by a thermistor or thermostat connected to a timer. Referring to FIG. 6, the cabinet may for example include air filters 88 and 89 for filtering the fresh and exhaust air entering the cabinet 1; the filters are shown in dotted outline only.

The apparatus shown in FIG. 1 as mentioned above also includes means for balancing the flow of fresh and exhaust air therethrough. Before describing such balancing means, however, reference will first be made to FIGS. 12 and 13 which illustrate the prior art system for balancing the air flows through ventilator.

Turning to FIG. 12, the previously known ventilation system balancing setup includes a ventilator apparatus 90. The exhaust air inflow into the ventilator 90 is shown by the arrow 91; the exhaust air outflow out of the ventilator 90 is shown by the arrow 92; the fresh air inflow into the ventilator 90 is shown by the arrow 93; and the fresh air outflow out of the ventilator 90 is shown by the arrow 94. The ductwork confining the exhaust air inflow includes a removable flowmeter element 95 and an exhaust damper element 96. The ductwork confining the fresh air outflow includes a removable flowmeter element 97 and an exhaust damper element 98. The elements 95 and 97 are known airflow measuring devices. The damper elements 96 and 98 are known types of circular plate dampers which are able to pivot about an axis so as to be able at one extreme present themselves edgewise to the airflow so as to present minimum resistances to such airflow or at the other extreme present the full face of their major surfaces perpendicularly to the air flow so as to present a maximum resistance to airflow.

Each of the elements 95 and 97 have a pair of pressure taps or connector elements for respectively measuring the differential pressure in the exhaust air and fresh air ducts, namely, pressure tap elements 100 and 101 for flowmeter element 95 and pressure tap elements 102 and 103 for flowmeter element 97.

A differential pressure gauge 104 is shown in FIG. 13 which has two pressure tap connector tubes for being connected to suitable pressure taps such as mentioned above; a suitable gauge is the Magnehelic Differential pressure gauge (the word "Magnehelic" is a registered Trademark) which may be obtained from Dwyer Instruments Inc., Michigan City, Ind. U.S.A. Two such gauges may be used for balancing purposes; one being connected to the pressure taps 100 and 101 and the other being connected to the pressure taps 102 and 103 which may be connected to a pair of pressure tap elements.

The exhaust and fresh air flows may be initially measured by placing the balancing dampers 96 and 98 as seen parallel to the air flow in respective air ducts so as to present a minimum resistance to air flow. The fresh air and exhaust air flow rates may then be determined using the respective flow meters. The fresh air damper 98 may in then be adjusted by turning the damper manually using the pivot handle 105 so as increase resistance to air flow in order to reduce the fresh air flow out of the ventilator to more or less equal the measured exhaust air inflow rate into the ventilator, i.e. as the damper is turned, so as to present a larger surface area transverse to the direction of the air flow, the flowmeter connected to pressure taps 102 and 103 is monitored and the adjustment of the damper 98 stopped once the flowmeter indicates a flow rate more or less equal to that of the exhaust air flowing into the ventilator as initially determined.

The exhaust air flow rate into the ventilator may then be remeasured and, if necessary, (i.e. if the exhaust flow is higher than the fresh air input flow), the exhaust air damper 96 may be adjusted using the handle 106 (i.e. turned so as to provide a resistance to air flow) so as to reduce the exhaust air flow input into the ventilator to more or less equal the adjusted fresh air flow out of the ventilator (e.g. the exhaust air flow may be adjusted so as to be somewhat smaller than the fresh air flow so as to provide a slight overpressure in the building, i.e. so as, for example, to inhibit uncontrolled entry of fresh air through other parts of the building). Thereafter the flowmeters 95 and 97 are removed and replaced with appropriate duct portions. This procedure may take up to an hour or more of a technician's time.

The example apparatus of the present invention, as illustrated in the FIGS. 1, 14, 15 and 16, includes two pairs of static pressure taps, namely taps 6 and 7 and taps 8 and 9. These pressure taps are defined by the door 3 of the cabinet of the ventilation apparatus; the door 3 as mentioned above defines a wall of the fresh air and of the exhaust air path means. The taps 6 and 7 are disposed on opposite sides of the wheel portion 37a such that the fresh air stream path defined by the wheel portion 37a is disposed therebetween. Similarly, the taps 8 and 9 are disposed on opposite sides of the wheel portion 37b such that the fresh air stream path defined by the wheel portion 37b is disposed therebetween. These static pressure taps may of course be positioned differently than as shown; i.e. instead of being positioned on the cabinet door, they may be positioned on the top wall, side wall, etc. of the cabinet.

FIGS. 17 to 20 illustrate possible configurations for the pressure tap openings. For the tap openings shown, the mouths 107 and 108 which are on the inside of cabinet are more or less flush with the wall surface defined by the foam element 4. The tap opening in FIGS. 17 and 18 has a more or less uniform cross section over it's entire length; on the other hand the tap opening shown in FIGS. 19 and 20 has a bevelled surface 109 on the inside of the cabinet wall. The taps if desired may include extensions projecting outwardly from the outer surface of the door to facilitate the connection of tubing thereto for connection to a meter.

As mentioned above pressure taps are disposed such that the fresh air and exhaust air stream paths are between respective pressure taps. If, for example, however, an air filter 89 (see FIG. 6) is present it has been found that the air filter 89 should also be disposed between taps 8 and 9 otherwise unreliable pressure readings were obtained; it is believed that this is due to turbulence induced by the filter which interferes with the possibility of obtaining a stable (static) pressure reading (such should be avoided for the reading).

Referring back to FIGS. 6, 7 and 8, the illustrated apparatus has a first adjustable damper means which includes the above described damper element 22 and a second adjustable damper means which includes the above described damper element 23. As mentioned above, although the illustrated ventilation apparatus is shown with these damper means the ventilation apparatus need not if desired be provided with such damper means; the damper means may be separately provided, for example, by the duct work of the building to which the ventilation apparatus is to be attached.

As may be seen the first adjustable damper means is disposed on the fresh air discharge side of the fresh air path means, and the second adjustable damper means is disposed on the exhaust air intake side of the exhaust air path means. The first adjustable damper means includes a handle 110 which is connected to the damper element 22 so that turning the handle will cause the damper element 22 to pivot about its pivot axis and block or unblock the air flow path. Similarly, the second adjustable damper means includes a handle 111 which is connected to the damper element 23 so that turning the handle will cause the damper element 23 to pivot about its pivot axis and block or unblock the air flow path.

In order to be able to exploit the balancing means provided with the ventilation apparatus a calibration airflow chart must be predetermined for each of the fresh air and exhaust air sides of the apparatus; the calibration chart will relate pressure difference values across each of the pressure tap pairs to a particular air flow rate value. Referring to FIG. 21, this figure shows an apparatus as illustrated in the above described FIGS. 1 to 10; the dampers 22 and 23 being removed. The ventilation apparatus is attached to ducting which includes: four static pressure measuring meter elements 113*a*, 113*b*, 113*c* and 113*d*; four pressure difference meters 114; two venturi type airflow measuring devices indicated generally by the reference numerals 115 and 116; and four dampers 116*a*, 116*b*, 116*c* and 116*d*. Airflow is induced through each of the fresh air and exhaust air sides of the apparatus by the motor of the apparatus itself. The air flow rate is varied by manipulating the dampers 116*a* to 116*d*. Thus the blower motor is started and the dampers 116*a* to 116*d* are manipulated until each respective meters 113*a* to 113*d* measures 0.1 inches of water absolute; the air flow rates are determined by the venturi assembly and the static pressure difference noted for such inflow and outflow rates across the pairs of static taps. This procedure is repeated at increments of 0.05 inches of water absolute (i.e. at 0.15 inches, 0.2 inches, 0.25 inches and so on until the flow rate is essentially zero cfm) at the meters 116*a* to 116*d*; the purpose of increasing the static air pressure is to reduce the air flow. For each effective air flow rate a pressure difference reading is thus recorded so as to establish for example a calibration columnar chart for each pressure tap pair, the chart having for example one column for airflow (e.g. cubic feet per minute—cfm) and a column for the pressure differences (e.g. inches of water) corresponding to each of the airflow rates; please see the above mentioned charts I and II.

Alternatively, rather than manipulating the dampers 116*a* to 116*d*, the air flow rate may be varied by connecting the motor to a variable speed controller such as for example a Variac or if desired different blower motors having different fixed speeds may be substituted one after the other in the apparatus.

Although each ventilator apparatus may be provided with an individual calibration chart this may not be economically practical. Thus, a single chart may be used with a plurality of ventilators having the same structural features; the chart having been obtained by calibrating a statistically acceptable number of machines so as to obtain a practical average value chart.

It is to be noted that the statistically obtained calibration chart can only be used for ventilation apparatuses which are of the same construction. Different calibration charts are to be expected if for example the exchanger core is different from one ventilator to the next.

Figure 22:
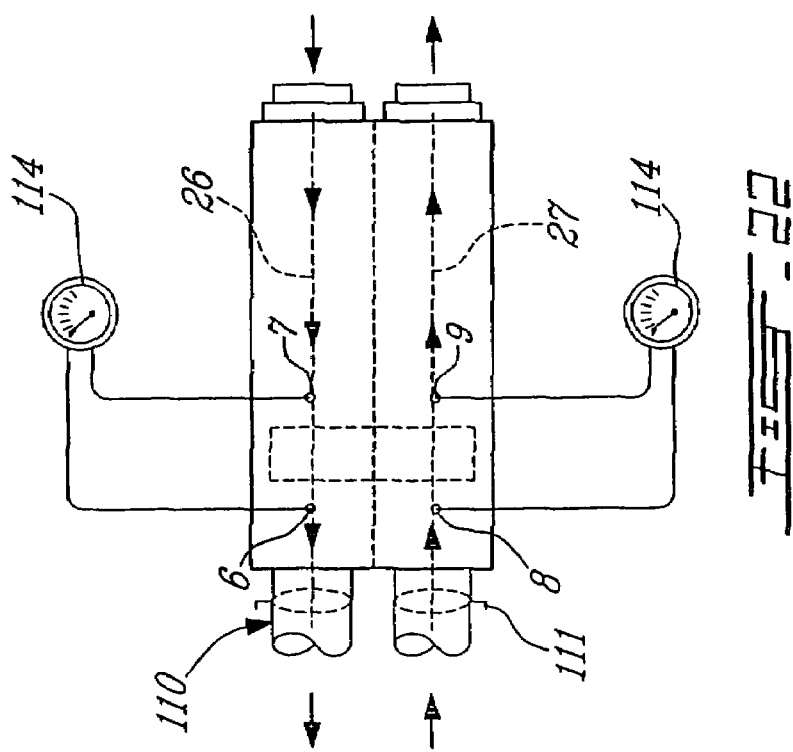
FIG. 22 is a schematic illustration of an arrangement for balancing the air flow for an apparatus shown in FIG. 1 connected to the duct work of a building (not shown)

An apparatus as described herein may be configured as a more or less constant flow apparatus wherein flow rates may be adjusted between high, medium and flow rates; i.e. the blower wheel has high, medium and low rotation speed settings. Referring to FIG. 22, an apparatus connected to the ductwork of a building may, for example, be balanced for example at a high (blower) speed level by initially measuring the fresh air pressure difference across the fresh air pressure tap pair (i.e. taps 6 and 7) and the exhaust air pressure difference across the exhaust air pressure tap pair (i.e. taps 8 and 9); the balancing dampers 110 and 111 being parallel to the air flow so as to present a minimum resistance to air flow. The fresh air and exhaust air pressure differences may then be determined using the respective pressure difference meters 114. The air flow rate values corresponding to the measured static pressure differences will then be determined by referring to the above mentioned respective calibration charts. The fresh air damper 110 may if necessary be adjusted so as to reduce the fresh air flow out of the ventilator to more or less equal the exhaust air input to the ventilator, i.e. as the fresh air damper is turned, so as to present a larger surface area transverse to the direction of the air flow, the appropriate pressure difference meter is monitored and the adjustment stopped once the pressure difference meter indicates a pressure difference indicative of an air flow rate more or less equal to that of the exhaust air flowing into the ventilator as initially determined.

The pressure difference (across taps 8 and 9) for the exhaust air into the ventilator may then be remeasured and the calibration charts reconsulted; if necessary, (i.e. if the exhaust flow is higher than the fresh air input flow), the exhaust air damper may be adjusted (i.e. turned into the air flow) so as to change the pressure difference across taps 8 and 9 so as to reflect a reduced exhaust air flow input into the ventilator which is more or less equal to the adjusted fresh air flow out of the ventilator (e.g. the exhaust air flow may be adjusted so as to be somewhat smaller than the fresh air flow so as to provide a slight overpressure in the building, i.e. so as, for example, to inhibit uncontrolled entry of fresh air through other parts of the building). This procedure may take up for example about 15 minutes of a technician's time.

Although as mentioned above the ventilator may be balanced at a high blower speed level the balancing procedure does not have to be repeated for the other blower speed levels.

Figure 23:
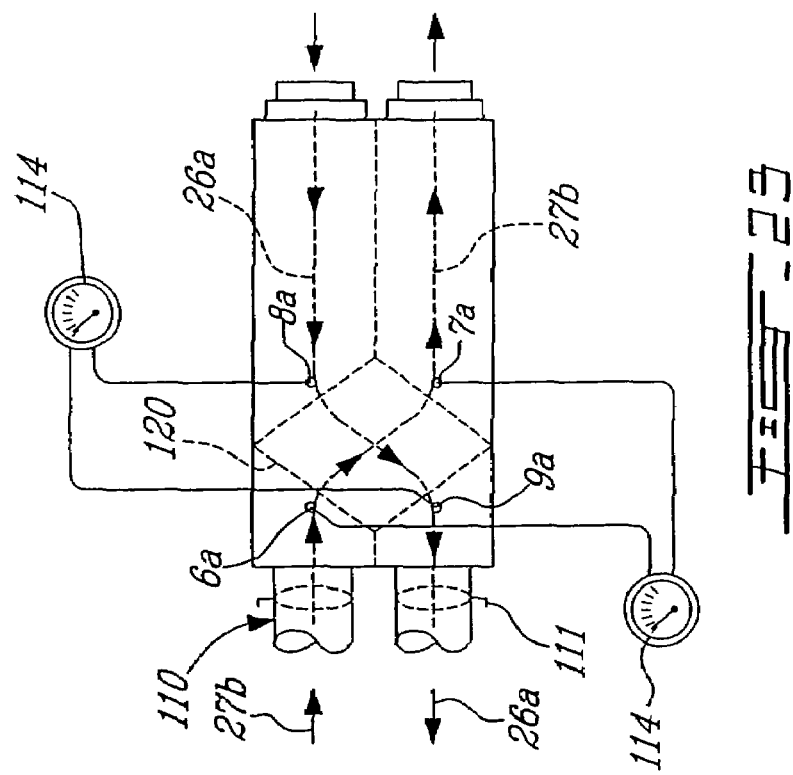
FIG. 23 is a schematic illustration of an arrangement for balancing the air flow for a ventilation apparatus shown having a rectangular exchange core connected to the duct work of a building (not shown)

Although the air flow balancing aspect of the present invention has been particularly described above with respect to a ventilator provided with a rotary exchanger wheel, this aspect may equally be applied to ventilators having other types of exchanger means. The exchanger means may, for example, take the form of a stationary cube discussed above. Thus, FIG. 23 schematically shows by way of additional example a ventilator such as described in the above mentioned U.S. Pat. No. 5,193,610 provided with a cubic stationary exchanger core 120 and also with static pressures taps 6*a*, 7*a*, 8*a*, and 9*a*; the pressure taps are constructed in a manner analogous to that for taps 6, 7, 8 and 9 mentioned above. As may be seen the fresh air flow path 26*a* and the exhaust air flow path 27*a* crisscross each other through the exchanger core 120. The fresh air pressure difference is taken across taps 6*a* and 7*a*; the exhaust air pressure difference is taken across taps 8*a* and 9*a*. As in the case for a ventilator as shown in FIGS. 1 to 10, calibration charts must be obtained for this ventilator type in a manner as described with respect to FIG. 21. Thereafter, the balancing of the ventilator connected to the duct work of a building proceeds as described above.

Figure 24:
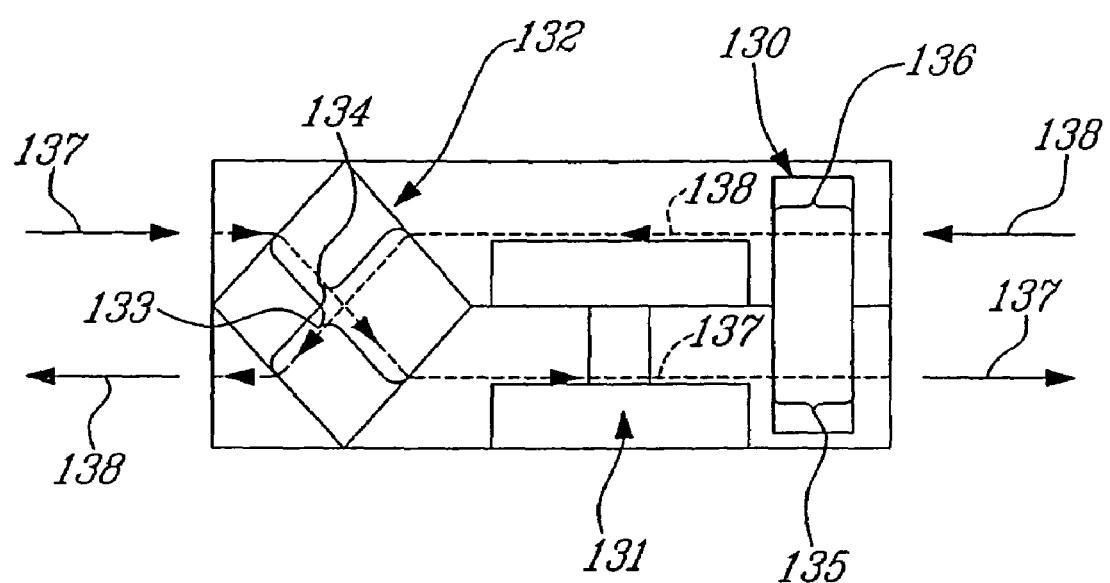
FIG. 24 is a schematic illustration of a ventilation apparatus comprising a desiccant wheel and a rectangular sensible heat exchanger.
Figure 25:
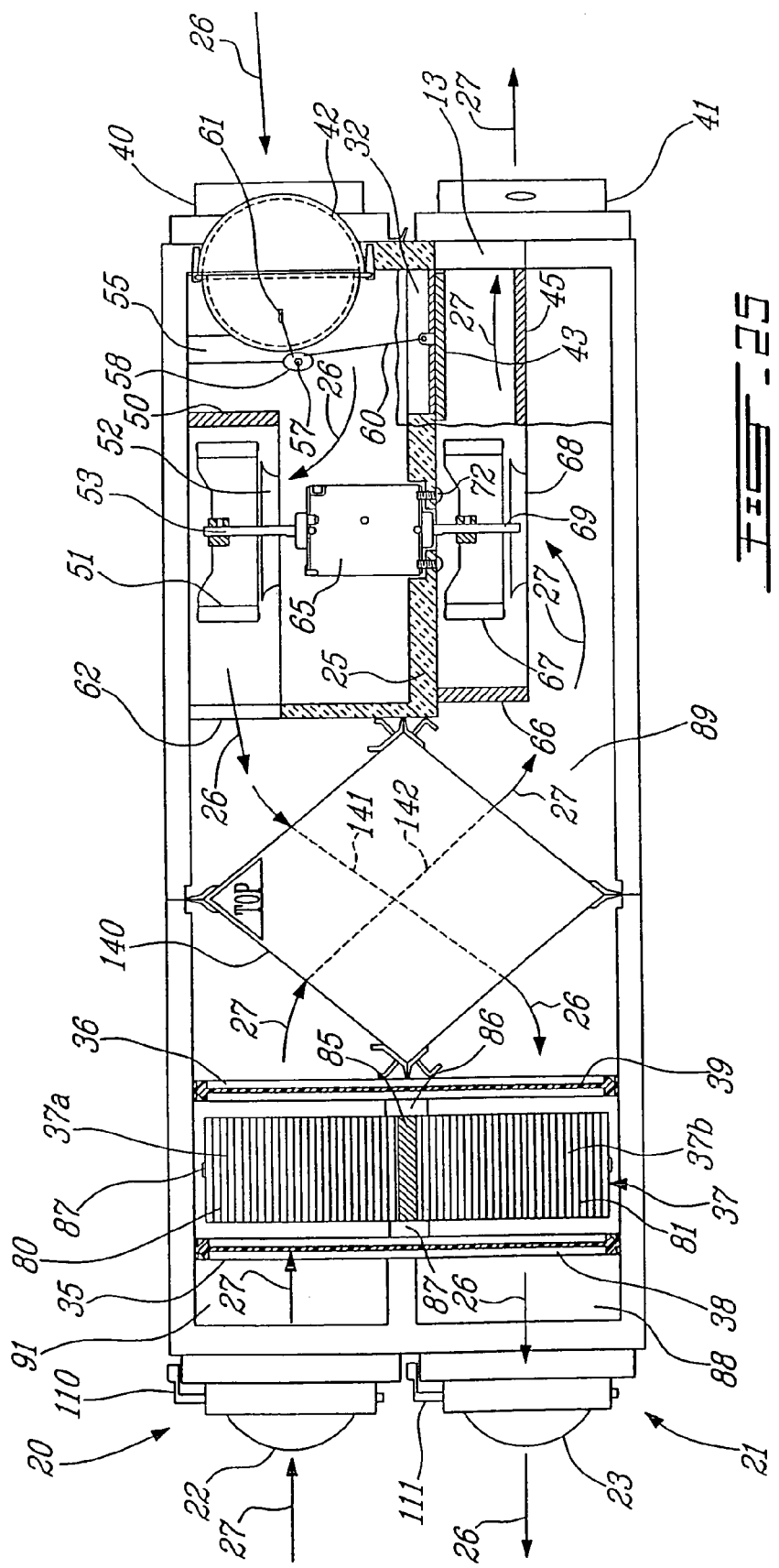
FIG. 25 is a schematic illustration of a ventilation apparatus as shown in FIG. 8 adapted to include a sensible heat exchanger along with a desiccant type rotary wheel.

Turning now to FIGS. 24 and 25, these figures illustrate a further embodiment of a ventilation apparatus in accordance with the present invention, namely, a ventilation apparatus which comprises a desiccant type wheel and a sensible heat exchanger (i.e. a non-rotating sensible heat exchanger). This type of apparatus exploits the method of the present invention whereby exhaust air is first dried (and cooled to some extent) and then further just cooled by a sensible heat exchanger.

FIG. 24 shows a schematic illustration of a pre-drying type ventilation apparatus in accordance with the present invention. The apparatus is generally provided with a desiccant rotary wheel 130, a blower assembly 131 and a sensible cube shaped exchanger 132 such as described in the above mentioned U.S. Pat. No. 5,193,610. The exchanger 132 is provided with a group of parallel channels disposed at right angles to another group of parallel channels as described in the above patent. One group of the channels is used to define a first air stream path 133 and the other a fourth air stream path 134. The wheel 130 similarly defines a second air stream path 135 and a third air stream path 136. As may be seen the path of incoming fresh air is identified by the arrows 137 and the outgoing exhaust air is identified by the arrows 138. Thus as may be seen warm humid exhaust air enters third air stream path 136 where it loses moisture and some heat; the dried exhaust air then travels through the fourth air stream path 134 giving up additional heat to the fresh air in the first air stream path 133. The warmed fresh air then passes through the second air stream path 135 where it may pick up water moisture and some additional sensible heat before being passed out of the apparatus for delivery to a building. In this manner, relatively humid exhaust air is not immediately subjected to an exchange with ambient exterior air which is relatively cool (e.g. −20° C.), but to an exchange with air which has been pre-heated to a higher temperature; this may extend the time during which the desiccant wheel is not iced up. Since the exhaust air sent on to the sensible exchanger from the desiccant exchanger carries less water there is also the advantage that the sensible exchanger will also not experience an ice blockage sufficient to require de-icing for a relatively extended period of time as compared to the use of such a wheel or stationary core alone. It has been found, for example, that a system set up as in FIG. 1 to 8 may require defrosting after about 32 minutes at an exterior air temperature of −15° C. or lower whereas a system set up generally as in FIG. 24 may go for up to 6 hours or more without the need to be defrosted; this represents a considerable energy efficiency gain.

A pre-dry apparatus as described herein and in particular with respect to FIG. 24 need not if so desired but may include some sort of defrost means. The defrost means may, for example, be as described above namely a defrost rotation component or a defrost air by-pass means. The defrost mechanism may, however, merely comprise the re-routing of the exhaust air through the fresh air side of the exchanger units back to the building. The blower assembly need not be disposed between the exchangers as in FIG. 24 but to one side thereof as shown in FIG. 25.

Thus for example FIG. 25 illustrates an example pre-dry ventilation system of the present invention which provides for a defrost function by the above mentioned exhaust air re-routing. The apparatus as shown comprises the elements as shown in FIG. 8 and to the extent that an element is common the same reference numerals are used in FIG. 24. The illustrated apparatus does not, however, have a defrost rotation component, i.e. it does not have an electrical switch whereby the motor used for urging the wheel 37 to rotate may be turned off during the defrost cycle.

As mentioned many of the components of the apparatus shown in FIG. 25 are common to the apparatus as shown in FIG. 8. Accordingly, the description of the common elements may be had by reference back to the above description relating to FIG. 8 and the related figures. The essential difference between the apparatus of FIG. 8 and FIG. 25 is that the apparatus in FIG. 25 is configured to include a rectangular (non-rotating) sensible heat exchanger 140 as described in the previously mention U.S. Pat. No. 5,193,610. The exchanger 140 is held in place as described in this patent such that the diagonally disposed channels are inclined such that when the apparatus is horizontally disposed these channels are self draining due to gravity, i.e. any water liquid therein flows downwardly out of the core. In the figure one of each of these diagonally disposed channels is designated by a reference numeral, namely reference numeral 141 and 142 respectively; these channels will be referred to hereinafter using these reference numerals. The channels are defined by air-to-air heat exchange walls.

The channels 141 define a first air stream path; the channels 142 define a fourth air stream path. These paths criss-cross each other.

The part 37a of the wheel 37 may be considered as defining a third air stream path and the part 37b a second air stream path. These paths are parallel to each other. As in the case of FIG. 8, the apparatus shown in FIG. 25 is in a ventilation configuration. The fresh air and exhaust air paths are mapped out by the arrows 26 and 27 respectively. As may be seen, during the ventilation cycle the fresh air travels first through the first air path defined by the channels 141 and then passes through the second air path defined by the part 37b of wheel 37. The exhaust air on the other hand flows through the third air stream path defined by the part 37a of the wheel and then flows through the channels 142 which define the fourth air stream path.

If the apparatus in FIG. 25 is to be defrosted it is placed in a defrost configuration by the lowering of the damper member 43 into the previously mentioned short channel member so as to block this channel and allow the exhaust air to be re-routed upwardly into the upper part of the cabinet from whence it flows back to the building first through the channels 141 and then the part 37b of the wheel 37 and in so doing may effect a defrosting of the apparatus due to recirculation of the exhaust air.

Although the apparatus as shown in FIG. 25 does not have a defrost rotation component, it may if so desired be suitably modified to have, for example, a rotation attenuation means as shown in FIG. 8 or in FIG. 11.

Although the example apparatus shown in FIGS. 24 and 25 exploits a cubic non-rotating sensible heat exchanger it is of course to be understood that the cubic exchanger may be replaced by a sensible heat rotary wheel exchanger having the configuration of wheel 37 in FIGS. 1 to 8 and being urged into rotation during ventilation by the same sort of motor/pulley/belt means. The use of a further wheel would mean that the fresh air and exhaust air paths would not criss-cross each other during operation of the apparatus. If desired defrost means as described above may be incorporated into such a ventilation device.

Turning now to FIGS. 26 and 27 these illustrate in schematic fashion a defrostable ventilation apparatus which has a by-pass means whereby exhaust air may be returned to the building using the fresh air discharge side of an apparatus, i.e. a by-pass channel is used to route exhaust air past the fresh air stream part of an exchanger wheel so as to avoid having the wheel pass heat back to the exhaust defrost air. For these figures the same reference numerals are used for the elements common with those of the apparatus of FIGS. 1 to 10. Basically the apparatus includes a further partition member 150.

The apparatus still has the damper member 43 and attendant means for the displacement thereof for opening and closing opening 32. When the damper member 43 is in a defrost configuration such that the opening 32 is open, the exhaust air is expelled into the pocket partially defined by the partition member 150, the partition member 25 and the other wall members disposed thereabout; the top wall is shown for purposes of illustration as being removed in both FIGS. 26 and 27. The exhaust air would then be able to travel through the opening 151 of tube member 152 and exit opening 153 into the fresh air discharge side of the apparatus. For the ventilation configuration the damper, member 43 would be raised to close the opening 32 and air would circulate as described above. Referring to FIG. 27 the wall portion 155 of the partition member 150 has a small opening 156 to allow motion of the member 61 to manipulate the damper 42. The portion of the partition member 150 apart from the wall member 155 is defined by the wall of the housing 150 and by a wall extension projecting downwardly from the housing 50 to the partition member 25 below. Although the by-pass channel in the illustrated apparatus has an exit communicating with the discharge side of the fresh air outlet side, the by-pass channel may if desired be defined by a separate channel member having its own separate discharge outlet for the air.

It is to be understood that the apparatus of the present invention may take many other forms without departing from the spirit and scope thereof as described in the present specification; the specific embodiment illustrated above being provided by way of illustrative example only.

What is claimed:

1. A ventilation apparatus, for exchanging air between the interior and exterior of a building, and for transferring, a member of the group comprising
   i) sensible heat and
   ii) sensible heat and water moisture, between exhaust air taken from the building and fresh air taken from the exterior ambient air for delivery to the building, said ventilation apparatus comprising
   fresh air path means having a fresh air intake side and a fresh air discharge side,
   exhaust air path means having an exhaust air intake side and an exhaust air discharge side,
   an exchanger for exchanging, a member selected from the group comprising i) sensible heat and ii) sensible heat and water moisture, between fresh air and exhaust air, said exchanger means being configured and disposed so as to define a first air stream path and a second air stream path,
       said first air stream path defining a portion of the fresh air path means between the fresh air intake side and the fresh air discharge side thereof and said second air stream path defining a portion of said exhaust air path means between the exhaust air intake side and the exhaust air discharge side thereof,
   characterized in that said ventilation apparatus comprises first, second, third and fourth static pressure taps,
   said first and second static pressure taps being configured and disposed for the determination of a first static pressure difference there between in said fresh air path means, said first air stream path being disposed between said first and second static pressure taps,
   said third and fourth static pressure taps being configured and disposed for the determination of a second static pressure difference therebetween in said exhaust air path means, said second air stream path being disposed between said third and fourth static pressure taps.

2. A ventilation apparatus as defined in claim 1 wherein said apparatus comprises
   a first adjustable damper component for adjusting air flow through said fresh air path means, and a
   second adjustable damper component for adjusting air flow through said exhaust air path means.

3. A ventilation apparatus as defined in claim 2 wherein said first adjustable damper component is disposed on the fresh air discharge side of said fresh air path means, and said second adjustable damper component is disposed on the exhaust air intake side of said exhaust air path means.

4. A ventilation apparatus as defined in claim 1 wherein said first and second pressure taps each comprise a pressure sampling aperture defined by a wall of said fresh air path means and wherein said third and fourth pressure taps each comprise a pressure sampling apertures defined by a wall of said exhaust air path means.

5. A ventilation apparatus as defined in claim 1 wherein said apparatus includes a fan component for forcing air to pass through said first and second air stream paths.

6. A ventilation apparatus as defined in claim 1 wherein said ventilation apparatus is configured as a constant flow ventilation apparatus.

7. A ventilation apparatus as defined in claim 1 wherein said exchanger comprises a rotary exchanger wheel for exchanging sensible heat.

8. A ventilation apparatus as defined in claim 1 wherein said exchanger comprises a rotary exchanger wheel for exchanging sensible heat and water moisture.

9. A ventilation apparatus as defined in claim 1 wherein said exchanger element comprises a sensible heat exchanger and comprises air-to-air heat exchanging walls between said first and second air stream paths.

10. A ventilation apparatus as defined in claim 9 wherein said sensible heat exchanger is of a rectangular parallelepiped shape, the first and second air paths thereof are disposed at right angles to each other and said sensible heat exchanger element is so disposed such that the first and second air paths are diagonally oriented so that they are self draining.

11. A ventilation apparatus as defined in claim 1 wherein said fresh air path means, said exhaust air path means, and said (heat/exchanger) means are disposed in a cabinet, wherein said fresh air intake side, said exhaust air discharge side, said fresh air discharge side and said exhaust air intake side each includes one respective air opening in a wall of said cabinet, wherein said first and second pressure tap means each comprise a pressure sampling aperture defined by a wall of said fresh air path means and wherein said third and fourth pressure tap means each comprise a pressure sampling apertures defined by a wall of said exhaust air path means.

12. A ventilation apparatus as defined in claim 11 wherein said fresh air path means comprises a wall of said cabinet which defines said apertures of said first and second pressure tap means, wherein said exhaust air path means comprises a wall of said cabinet which defines said apertures of said third and fourth pressure tap means.

13. A ventilation apparatus as defined in claim 12 wherein said apparatus comprises a first adjustable damper component for adjusting air flow through said fresh air path means, and a second adjustable damper component for adjusting air flow through said exhaust air path means.

14. A ventilation apparatus as defined in claim 13 wherein said first adjustable damper component is disposed on the fresh air discharge side of said fresh air path means, and said second adjustable damper component is disposed on the exhaust air intake side of said exhaust air path means.

15. A ventilation apparatus as defined in claim 14 wherein said exchanger means comprises a rotary exchanger wheel.

16. A ventilation apparatus as defined in claim 15 wherein said apparatus includes a fan component for forcing air to pass through said first and second air stream paths.

17. A defrostable ventilation apparatus, for exchanging air between the interior and exterior of a building, for transferring water moisture and sensible heat between exhaust air taken from the building and fresh air taken from the exterior ambient air for delivery to the building, and wherein air from the interior of the building is used as defrost air to defrost the ventilation apparatus, said ventilation apparatus comprising
   fresh air path means having a fresh air intake side and a fresh air discharge side,
   exhaust air path means having an exhaust air intake side and an exhaust air discharge side,
   an exchanger comprising
      a desiccant exchanger element for transfer of water moisture and sensible heat between said exhaust air and said fresh air, and
      a sensible heat exchanger element for transfer of sensible heat between said exhaust air and said fresh air,
   said desiccant exchanger element comprising a rotary exchanger wheel configured and rotatably disposed so as to define a second air stream path and a third air stream path,
   said second air stream path defining a portion of said fresh air path means and said third air stream path defining a portion of said exhaust air path means, said sensible heat exchanger element comprising
      a first air path defining a portion of said fresh air path means and a fourth air path defining a portion of said exhaust air path means,
   said first and second air stream paths defining respective portions of said fresh air path means between the intake and discharge sides of said fresh air path means, said third and fourth air stream paths defining respective portions of said exhaust air path means between the intake and discharge sides of said exhaust air path means, said fresh air path means and said exhaust air path means being disposed and configured such that during a ventilation cycle,
   exhaust air entering the exhaust air intake side flows through said third air stream path and then through said fourth air stream path and fresh entering said the fresh air intake side flows through said first air stream path and then through said second air stream path, said ventilation apparatus including
   a rotation component for inducing rotation of said exchanger wheel through said fresh air path means and said exhaust air path means,
   defrost air path means for providing an air path by-passing said first air steam path, said defrost air path means comprising a defrost air discharge side and being configured to connect the exhaust air discharge side with the defrost air discharge side thereof for conveying defrost air to said defrost air discharge side from said exhaust air discharge side, and
   a damper component, said damper component being displaceable between a ventilation configuration for a ventilation cycle wherein said defrost air path means is closed off and said fresh air intake side and said exhaust air discharge side are open, and a defrost configuration for a defrost cycle wherein said fresh air intake side and said exhaust air discharge side are closed off and said defrost air path means is open, and wherein during a ventilation cycle, when said damper component is in said ventilation configuration, fresh air is able to flow through said fresh air path means and exhaust air is able to flow through said exhaust air path means, and during a defrost cycle, when said damper component is in said defrost configuration,
   defrost air taken from the building, is able to circulate, for delivery back into the building, through said exhaust air intake side, through said second air stream path, then through said defrost air path means, and through said defrost air discharge side.

18. A defrostable ventilation apparatus, for exchanging air between the interior and exterior of a building, for transferring water moisture and sensible heat between exhaust air taken from the building and fresh air taken from the exterior ambient air for delivery to the building, and wherein air from the interior of the building is used as defrost air to defrost the ventilation apparatus, said ventilation apparatus comprising
   fresh air path means having a fresh air intake side and a fresh air discharge side,
   exhaust air path means having an exhaust air intake side and an exhaust air discharge side,
   an exchanger comprising
      a desiccant exchanger element for transfer of water moisture and sensible heat between said exhaust air and said fresh air, and
   a sensible heat exchanger element for transfer of sensible heat between said exhaust air and said fresh air,
   said desiccant exchanger element comprising a rotary exchanger wheel configured and rotatably disposed so as to define a second air stream path and a third air stream path, said second air stream path defining a portion of said fresh air path means and said third air stream path defining a portion of said exhaust air path means, said sensible heat exchanger element comprising
   a first air path defining a portion of said fresh air path means and a fourth air path defining a portion of said exhaust air path means, said first and second air stream paths defining respective portions of said fresh air path means between the intake and discharge sides of said fresh air path means, said third and fourth air stream paths defining respective portions of said exhaust air path means between the intake and discharge sides of said exhaust air path means, said fresh air path means and said exhaust air path means being disposed and configured such that during a ventilation cycle,
   exhaust air entering the exhaust air intake side flows through said third air stream path and then through said fourth air stream path and fresh entering said the fresh air intake side flows through said first air stream path and then through said second air stream path,
   said ventilation apparatus including
   a rotation component for inducing rotation of said exchanger wheel through said fresh air path means and said exhaust air path means,
   defrost air path means for providing an air path by-passing said first air steam path, said defrost air path means being configured to connect the exhaust air discharge side with the fresh air discharge side for conveying defrost air to said fresh air discharge side from said exhaust air discharge side, and
   a damper component, said damper component being displaceable between a ventilation configuration for a ventilation cycle, wherein said defrost air path means is closed off and said fresh air intake side and exhaust air discharge side are open, and a defrost configuration for a defrost cycle wherein said fresh air intake side and said exhaust air discharge side are closed off, and said defrost air path means is open, and wherein during a ventilation cycle, when said damper component is in said ventilation configuration, fresh air is able to flow through said fresh air path means and exhaust air is able to flow through said exhaust air path means, and during a defrost cycle, when said damper component is in said defrost configuration, defrost air taken from the building, is able to circulate, for delivery back into the building, through said exhaust air intake side, through said second air stream path, then through said defrost air path means, and through said fresh air discharge side.

* * * * *